United States Patent
Nammi

(10) Patent No.: US 8,995,545 B2
(45) Date of Patent: Mar. 31, 2015

(54) BASE STATION AND METHOD FOR TRANSMITTING CONTROL INFORMATION TO A USER EQUIPMENT (UE)

(71) Applicant: Telefonaktiebolaget L M Ericsson (publ), Stockholm (SE)

(72) Inventor: Sairamesh Nammi, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 13/880,466

(22) PCT Filed: Mar. 15, 2013

(86) PCT No.: PCT/SE2013/050271
§ 371 (c)(1),
(2) Date: Apr. 19, 2013

(87) PCT Pub. No.: WO2014/021756
PCT Pub. Date: Feb. 6, 2014

(65) Prior Publication Data
US 2014/0056372 A1 Feb. 27, 2014

Related U.S. Application Data

(60) Provisional application No. 61/677,120, filed on Jul. 30, 2012.

(51) Int. Cl.
| | |
|---|---|
| H04L 23/02 | (2006.01) |
| H04W 72/04 | (2009.01) |
| H04L 1/00 | (2006.01) |
| H04L 5/00 | (2006.01) |

(Continued)

(52) U.S. Cl.
CPC ......... *H04W 72/0406* (2013.01); *H04L 1/0029* (2013.01); *H04L 1/0059* (2013.01);

(Continued)

(58) Field of Classification Search
CPC .............................. H04L 27/38; H04L 27/34
USPC .......... 375/261, 131, 258, 295; 370/329, 335, 370/342, 345; 714/752, 758
See application file for complete search history.

(56) References Cited

U.S. PATENT DOCUMENTS

| | | | |
|---|---|---|---|
| 2008/0104475 A1 | 5/2008 | Pietraski et al. | |
| 2013/0155968 A1* | 6/2013 | Pelletier et al. | 370/329 |
| 2013/0329652 A1* | 12/2013 | Pani et al. | 370/329 |

FOREIGN PATENT DOCUMENTS

WO  2013169163 A1  11/2013

OTHER PUBLICATIONS

Renesas Mobile Europe Ltd, "HS-SCCH Design for Four Branch Downlink MIMO", 3GPP Draft; R1-122336 4 Branch_DL MIMO _HS SCCH, 3rd Generation Partnership Project (3GPP), Mobile Competence Centre, 650, Route Des Lucioles, F-06921 Sophia-Antipolis Cedex, France, vol. RAN WG1, No. Prague, Czech Republic, May 21-25, 2012, May 12, 2012, 3 pages, XP050600599.
Huawei et al., "HS-SCCH Design for 4-Branch MIMO", 3GPP Draft, R1-122683 HS-SCCH Design for DL 4-Branch MIMO, 3rd Generation Partnership Project (3GPP), Mobile Competence Centre, 650, Route Des Lucioles, F-06921 Sophia-Antipolis Cedex, France, vol. RAN WG1, No. Prague, Czech Republic, May 21-25, 2012, May 12, 2012, 5 pages, XP050600868.

(Continued)

*Primary Examiner* — Khai Tran
(74) *Attorney, Agent, or Firm* — Rothwell, Figg, Ernst & Manbeck, P.C.

(57) ABSTRACT

A method for transmitting to a UE control information comprising: channelization-code-set information ($x_{ccs,1}$, $x_{ccs,2}$, ..., $x_{ccs,7}$); modulation-scheme and number of transport blocks information ($x_{ms,1}$, $x_{ms,2}$, $x_{ms,3}$, $x_{ms,4}$, $x_{ms,5}$); and precoding weight information ($x_{pwipb,1}$, $x_{pwipb,2}$, $x_{pwipb,3}$, $x_{pwipb,4}$). The method includes: multiplexing the channelization-code-set information, the modulation-scheme and number of transport blocks information and the precoding weight information to give a sequence of sixteen bits $x_{1,1}$, $x_{1,2}$, ..., $x_{1,16}$, where $x_{1,i} = x_{ccs,i}$ for i=1, 2, ..., 7; $x_{1,i} = x_{ms,i-7}$ for i=8, 9, 10, 11, 12; and $x_{1,i} = x_{pwipb,i-12}$ for i=13, 14, 15, 16; applying rate 1/2 convolutional coding to the sequence of bits $x_{1,1}$, $x_{1,2}$, ..., $x_{1,16}$ to obtain bit sequence $z_{1,1}$, $z_{1,2}$, ..., $z_{1,48}$; and puncturing the bits $z_{1,1}$, $z_{1,2}$, $z_{1,4}$, $z_{1,8}$, $z_{1,42}$, $z_{1,45}$, $z_{1,47}$, $z_{1,48}$ from sequence $z_{1,1}$, $z_{1,2}$, ..., $z_{1,48}$ to obtain an output sequence $r_{1,1}$, $r_{1,2}$ ... $r_{1,40}$.

13 Claims, 13 Drawing Sheets

(51) Int. Cl.
*H04B 7/04* (2006.01)
*H04L 1/18* (2006.01)

(52) U.S. Cl.
CPC ............ *H04L1/0068* (2013.01); *H04L 5/0053* (2013.01); *H04B 7/0456* (2013.01); *H04L 1/0041* (2013.01); *H04L 1/0073* (2013.01); *H04L 1/1822* (2013.01); *H04L 1/0025* (2013.01); *H04L 1/0031* (2013.01); *H04L 1/1896* (2013.01)
USPC ........................................................ 375/261

(56) References Cited

OTHER PUBLICATIONS

Huawei at al., "Further Discussion on HS-SCCH Design", 3GPP Draft, R1-123816 Further Discussion on HS-SCCH Design, 3rd Generation Partnership Project (3GPP), Mobile Competence Centre, 650, Route Des Lucioles, F-06921 Sophia-Antipolis Cedex, France, vol. RAN WG1, No. Qingdao, China, Aug. 13-17, 2012, Aug. 5, 2012, 7 pages, XP050661669.

* cited by examiner

BASE STATION AND METHOD FOR TRANSMITTING CONTROL INFORMATION TO A USER EQUIPMENT (UE)

CROSS-REFERENCE TO RELATED APPLICATIONS

This application is a 35 U.S.C. §371 National Phase Application from PCT/SE2013/050271, filed Mar. 15, 2013, and designating the United States, and claims priority to Provisional Application No. 61/677,120, filed Jul. 30, 2012. The above-mentioned applications are incorporated by reference herein.

TECHNICAL FIELD

The field of the present disclosure is that of transmission of control information to a UE in, for example, a high-speed downlink packet access (HSDPA) mobile communication system.

BACKGROUND

A key characteristic of HSDPA is the use of shared-channel transmission, which implies that a certain fraction of the total downlink radio resources available within a cell, channelization code sets, and transmission power may be seen as a common resource that is dynamically shared between users, primarily in the time domain. The use of shared channel transmission on a downlink shared channel (DSCH), which in WCDMA and other systems is implemented through the High-Speed Downlink Shared Channel (HS-DSCH), enables the possibility to rapidly allocate a large fraction of the downlink resources for transmission of data to a specific user. The HS-DSCH may be associated with a group of channelization code sets. Each such channelization code set is also known as a High-Speed Physical Downlink Shared Channel (HS-PDSCH). When a base station (e.g., a NodeB or other base station) has data to send to a particular UE, the NodeB must first schedule the UE (i.e., allocate to the UE an HS-PDSCH) and then use the allocated HS-PDSCH to transmit the data to the UE. Dynamic allocation of the HS-PDSCH for transmission to a specific user maybe done on a 2 ms transmission-time-interval (TTI).

Downlink control signaling is necessary for the operation of HS-DSCH. For example, the identity of the UE that is being scheduled must be signaled to the UE along with an identification of the HS-PDSCH so that the UE will know that the base station will soon be transmitting data for the UE and will know the physical channel (e.g., code set) that is being used to send the data. The UE also needs to be informed about other parameters (e.g., the transport format used for the data transmission as well as other information). This downlink control signaling is carried on the High-Speed Shared Control Channel (HS-SCCH), which may be transmitted in a parallel to the HS-DSCH using a separate channelization code set. The HS-SCCH is a shared channel.

Referring now to FIG. 1, FIG. 1 shows an example message exchange between a NodeB 104 and a UE 106 in a HSDPA system 100. As shown in FIG. 1, the NodeB 104 transmits a pilot signal on a common pilot channel (e.g., the CPICH). The UE receives the pilot signal and uses it to compute channel quality information (CQI) and a precoding channel indicator. This information along with other information (e.g., hybrid automatic repeat request (HARQ) acknowledgement/negative acknowledgement (ACK/NAK)) is reported to the NodeB using, for example a high speed dedicated physical control channel (HS-DPCCH). The NodeB then schedules the UE for a downlink transmission and decides on the parameters for the transmission including: the HS-PDSCH, modulation and rank information (RI) (number of transport blocks), and precoding weight information (also known as precoding index (PCI)). This control information is sent to the UE using the HS-SCCH. After the control information is transmitted using HS-SCCH, the data is transmitted using the selected HS-PDSCH.

Requirements on different parts of the control information that need to be available to the UE has affected the detailed structure of the HS-SCCH. For UE complexity reasons, it is beneficial if the channelization code set is known to the UE prior to the start of the data transmission on the HS-DSCH. Otherwise the UE would have to buffer the received signal prior to dispreading or, alternatively, despread all potential HS-DSCH code sets. On the other hand, the transport block size and other information are only needed at HS-DSCH decoding/soft combining, which usually does not start until the end of the HS-DSCH TTI. Thus, the HS-SCCH information is split into two parts, part 1 and part 2. For a 2 branch multiple-input and multiple-output (MIMO) system, part 1 consists of 12 bits. These 12 bits convey information about: the channelization code set (CCS) (7 bits), the modulation scheme (3 bits), and the precoding weight information (PCI) (2 bits). RI is implicitly informed through the modulation information (MI) (i.e., the modulation scheme). Part 2 consists of 36 bits, out of which 6 bits for each transport block, 4 bits for HARQ process, 4 bits for redundancy version for the two streams and 16 bits for the identity, ID, of the UE. For single stream transmission, only 28 bits are needed for part 2 information.

The HS-SCCH coding, physical channel mapping and timing relation to the HS-DSCH is illustrated in FIG. 2. With the scheme shown in FIG. 2, the part 1 information can be decoded after one slot of the HS-SCCH subframe.

Current work within the third generation partnership project, 3GPP, regarding HSDPA evolution include addition of several new features in order to meet the requirements set by the International Mobile Telecommunications Advanced, IMT-A. The main objective of these new features is to increase the average spectral efficiency. One possible technique for improving downlink spectral efficiency would be to introduce support for four branch MIMO, i.e. utilize up to four transmit and receive antennas to enhance the spatial multiplexing gains and to offer improved beam forming capabilities. Four branch MIMO provides up to 84 Mbps per 5 MHz carrier for high signal to noise ratio, SNR, users and improves the coverage for low SNR users.

Introduction of four branch MIMO will require a new control channel structure to send the downlink grant information to the UE. Since four branch MIMO requires more bits for reporting RI and PCI this means more power is required for the control channel. However, more power to control channel degrades the performance of the HS-PDSCH, and hence degrades the system throughput.

SUMMARY

In one aspect, the invention relates to an improved process for encoding control information transmitted to a UE from a base station in a MIMO system. An advantage of the improved process is that it saves power due to the fact that fewer bits are used to report control information to the UE. In some embodiments, the process may begin with the base station receiving data intended for the UE or generating data intended for the UE. The base station selects the UE from a set of UEs that the base station is serving and selects and/or determines control information for use in transmitting the data to the UE on a shared data channel (e.g., HS-DSCH). The control information selected/determined may include: CCS, RI, MI, and PCI, where each has a corresponding bit sequence. The bit sequences are multiplexed to produce a bit sequence X1, (in some embodiments X1 is sixteen bits). In some embodiments, the first portion of X1 (e.g., the first seven bits of X1) identify a CCS, the next portion of X1 (e.g., the next five bits) identify an RI/MI pair, and the last portion of X1 (e.g., the four two bits of X1) identify a PCI. Next, rate r (e.g., r=1/2, or r=1/4) convolutional coding is applied to the sequence of bits X1 to produce encoded bit sequence Z1. That is, for example, bit sequence X1 is padded with bit sequence P (in some embodiments P is eight bits in length) to produce bit sequence X'1 and bit sequence X'1 is convolution encoded to produce encoded bit sequence 21. Depending on the length of X'1 and on the rate of the convolutional encoder, Z1 may be, for example, 48 or 72 bits. For example, when X'1 is 24 bits and the rate is 1/2, then Z1=48 bits and when X'1 is 24 bits and the rate is 1/3, then Z1=72 bits. The encoded bits Z1 are then punctured by a rate matcher to produce bit sequence R1 (in some embodiments Z1 is punctured such that R1 is 40 bits in length). In some embodiments, the encoded bits R1 are bit-masked with a UE specific sequence (UESS) (which may be generated by an encoder that encodes a 16-bit UE ID using a (40, 16) punctured convolutional code) to produce a bit sequence S1 (in some embodiments S1=40 bits). For example, in some embodiments, UESS and R1 may be XORd by a logic circuit to produce S1. In some embodiments, S1 is then spread by spreading factor 128, QPSK modulated, and transmitted in one slot.

In one particular embodiment, when the rate is 1/2 and the generator polynomials of the convolutional encoder are [561 753], the following puncturing pattern is used by the rate matcher: [4, 10, 16, 22, 28, 34, 40, and 46]. That is, bits 4, 10, 16, 22, 28, 34, 40, and 46 are removed from Z1 by rate matcher to produce R1. This embodiment is referred to as "option 1 (OPT1)."

In another particular embodiment, when the rate is 1/2 and the generator polynomials are [561 753], the following puncturing pattern is used by the rate matcher: [1, 2, 4, 8, 42, 45, 47 and 48]. This embodiment is referred to as "option 2 (OPT2)."

In yet another particular embodiment, when the rate is 1/3 and the generator polynomials are [557 663 711], the following puncturing pattern is used by the rate matcher: [2, 5, 7, 9, 11, 14, 16, 18, 20, 23, 25, 27, 29, 32, 34, 36, 38, 41, 43, 45, 47, 50, 52, 54, 56, 59, 61, 63, 65, 68, 70, 72]. This embodiment is referred to as "option 3 (OPT3)."

In another aspect, there is provided a method for transmitting to a user equipment, UE, control information comprising: channelization-code-set information consisting of seven bits ($x_{ccs,1}, x_{ccs,2}, \ldots, x_{ccs,7}$); modulation-scheme and number of transport blocks information consisting of five bits ($x_{ms,1}, x_{ms,2}, x_{ms,3}, x_{ms,4}, x_{ms,5}$); and precoding weight information consisting of four bits ($x_{pwipb,1}, x_{pwipb,2}, x_{pwipb,3}, x_{pwipb,4}$). In some embodiments, the method comprises: multiplexing the channelization-code-set information, the modulation-scheme and number of transport blocks information and the precoding weight information to give a sequence of sixteen bits ($x_{1,1}, x_{1,2}, \ldots, x_{1,16}$) where $x_{1,i}=x_{ccs,i}$ for i=1, 2, . . . , 7; $x_{1,i}=x_{ms,i-7}$ for i=8, 9, 10, 11, 12; and $x_{1,i}=x_{pwipb,i-12}$ for i=13, 14, 15, 16; applying rate 1/2 convolutional coding to the sequence of bits $x_{1,1}, x_{1,2}, \ldots, x_{1,16}$ to obtain a forty-eight bit sequence, ($z_{1,1}, z_{1,2}, \ldots, z_{1,48}$); and puncturing the bits $z_{1,1}$, $z_{1,2}, z_{1,4}, z_{1,8}, z_{1,42}, z_{1,45}, z_{1,47}, z_{1,48}$ from sequence $z_{1,1}, z_{1,2}, z_{1,48}$ to obtain an output sequence consisting of forty bits ($r_{1,1}, r_{1,2} \ldots r_{1,40}$).

In some embodiments, the step of applying rate 1/2 convolutional coding to the sequence of bits $x_{1,1}, x_{1,2}, \ldots, x_{1,16}$ to obtain sequence $z_{1,1}, z_{1,2}, \ldots, z_{1,48}$ comprises: padding X1 with bit sequence P to produce bit sequence X'1, where X1=$x_{1,1}, x_{1,2}, \ldots, x_{1,16}$; and convolution encoding X'1 to produce the forty-eight bit sequence.

In some embodiments, the method further comprises bit masking the output sequence (R1) with a UE specific sequence (UESS) to produce a bit sequence S1. The bit masking step may consist of using a logic circuit to XOR UESS and R1 to produce S1. The UESS may be generated by an encoder that encodes a 16-bit communication device identifier using a punctured convolutional code. In some embodiments, S1 is spread by spreading factor 128, QPSK modulated, and transmitted in one slot (1216).

In another aspect a base station is provided wherein the base station is configured to perform the method described above. For example, in some embodiments, the base station comprises an encoding unit for: multiplexing the channelization-code-set information, the modulation-scheme and number of transport blocks information and the precoding weight information to give a sequence of sixteen bits $x_{1,1}, x_{1,2}, \ldots, x_{1,16}$ (X1), where $x_{1,i}=x_{ccs,i}$ for i=1, 2, . . . , 7; $x_{1,i}=x_{ms,i-7}$ for i=8, 9, 10, 11, 12; and $x_{1,i}=x_{pwipb,i-12}$ for i=13, 14, 15, 16; applying rate 1/2 convolutional coding to the sequence of bits $x_{1,1}, x_{1,2}, \ldots, x_{1,16}$ to obtain a forty-eight bit sequence ($z_{1,1}, z_{1,2}, z_{1,48}$); and puncturing the bits $z_{1,1}, z_{1,2}, z_{1,4}, z_{1,8}, z_{1,42}, z_{1,45}, z_{1,47}, z_{1,48}$ from sequence $z_{1,1}, z_{1,2}, z_{1,48}$ to obtain an output sequence consisting of forty bits ($r_{1,1}, r_{1,2} \ldots r_{1,40}$).

In another aspect, the invention relates to an improved base station for use in a in a MIMO system. In some embodiments, the improved base station includes a receiver for receiving data intended for a UE and/or a data generator for generating data intended for the UE. The base station may further include a scheduler for selecting the UE from a set of UEs that the base station is serving and for selecting and/or determining control information for use in transmitting the received or generated data to the UE on a shared data channel (e.g., HS-DSCH). The control information selected/determined may include: CCS, RI, MI, and PCI, where each has a corresponding bit sequence. The base station may further include a multiplexor for multiplexing the bit sequences to produce a bit sequence X1, (in some embodiments X1 is sixteen bits). In some embodiments, the first portion of X1 (e.g., the first seven bits of X1) identify a CCS, the next portion of X1 (e.g., the next five bits) identify an RI/MI pair, and the last portion of X1 (e.g., the next four bits of X1) identify a PCI. The base station may also include a padder that pads X1 with bit sequence P (in some embodiments P is eight bits in length) to produce bit sequence X'1 (i.e., X'1=X1+P). The base station also includes a convolutional encoder that convolution encodes X'1 to produce encoded bit sequence Z1. Depending on the length of X'1 and on the rate of the convolutional encoder, Z1 may be, for example, 48 or 72 bits. For example, when X'1 is 24 bits and the rate is 1/2, then Z1=48 bits and when X'1 is 24 bits and the rate is 1/3, then Z1=72 bits. The encoded bits Z1 are then punctured by a rate matcher to produce bit sequence R1 (in some embodiments Z1 is punctured such that R1 is 40 bits in length). In some embodiments, the base station also includes a logic circuit configured to bit-mask R1 with a UE specific sequence (UESS) (which may be generated by an encoder that encodes a 16-bit UE ID using a (40, 16) punctured convolutional code) to produce a bit sequence S1 (in some embodiments S1=40 bits). For example, in some embodiments, UESS and R1 may be XORd by logic circuit to produce S1. Base station also includes a transmitter that then spreads, modulates and transmits S1 in one slot.

DETAILED DESCRIPTION

Figure 3:
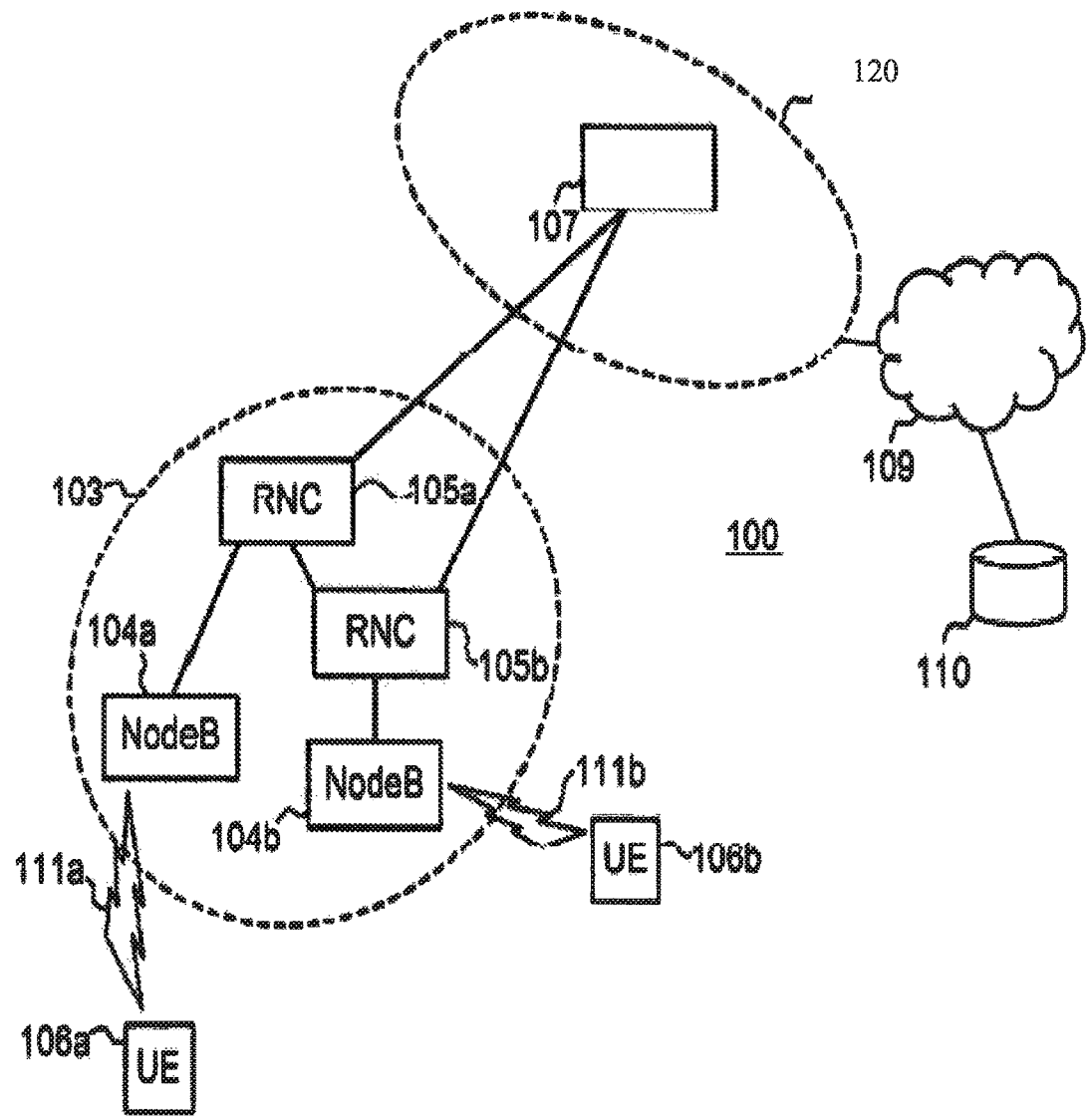
FIG. 3 illustrates an exemplary system.

FIG. 3 illustrates schematically a universal mobile telecommunications system, UMTS, network 100 in which the present methods and apparatuses can be implemented. It should be noted, however, that the skilled person will readily be able to perform implementations in other similar communication systems involving transmission of coded data between nodes.

In FIG. 3 the UMTS network 100 comprises a core network 120 and a UMTS terrestrial radio access network, UTRAN, 103. The UTRAN 103 comprises a number of nodes in the form of radio network controllers (RNC) 105 (e.g., RNCs 105a,b), each of which is coupled to a set of neighbouring nodes in the form of one or more NodeBs 104 (e.g, NodeBs 104a,b). Each NodeB 104 is responsible for a given geographical radio cell and the controlling RNC 105 is responsible for routing user and signalling data between that NodeB 104 and the core network 120. All of the RNC's 105 may be coupled to one another. A general outline of the UTRAN 103 is given in 3GPP technical specification TS 25.401 V3.2.0.

FIG. 3 also illustrates communication devices 106 (a.k.a., user equipments (UEs) (e.g., UEs 106a, 106b) connected to a respective NodeB 104a, 104b in the UTRAN 103 via a respective air interface 111a, 111b. UEs served by one NodeB, such as UE 106a served by NodeB 104a, are located in a so-called radio cell. The core network 120 comprises a number of nodes represented by node 107 and provides communication services to the UE 106 via the UTRAN 103, for example when communicating with the Internet 109 where, schematically, a server 110 illustrates an entity with which the UEs 106 may communicate. As the skilled person realizes, the network 100 in FIG. 3 may comprise a large number of similar functional units in the core network 120 and the UTRAN 103, and in typical realizations of networks, the number of mobile devices may be very large.

Furthermore, as will be discussed in detail in the following, communication between the nodes in the UTRAN 103 and the UEs 106 may follow the protocols as specified by 3GPP HSPA specifications.

Figure 4:
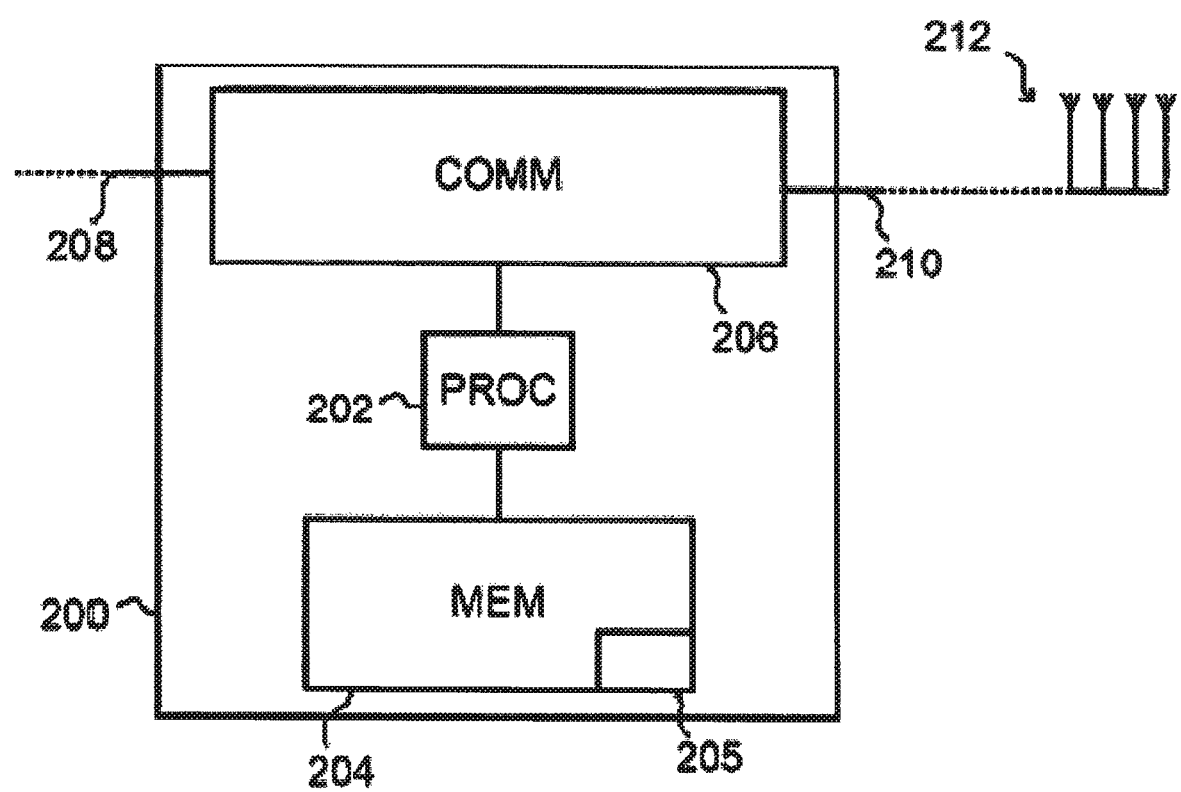
FIG. 4 is a block diagram of an example base station.

FIG. 4 is a functional block diagram that schematically illustrates base station 104, according to some embodiments. In the embodiment of FIG. 4, the base station 104 represents a NodeB.

The base station 104 comprises processing means, memory means and communication means in the form of a processor 202, a memory 204 and communication circuitry 206. The base station 104 communicates with other nodes in via a first data path 208 and via a second data path 210. For example, the first data path 208 can be connected to a RNC and the second data path 210 can connected to one or more antennas 212. The data paths 208, 210 can be any of uplink and downlink data paths, as the skilled person will realize.

Figure 5:
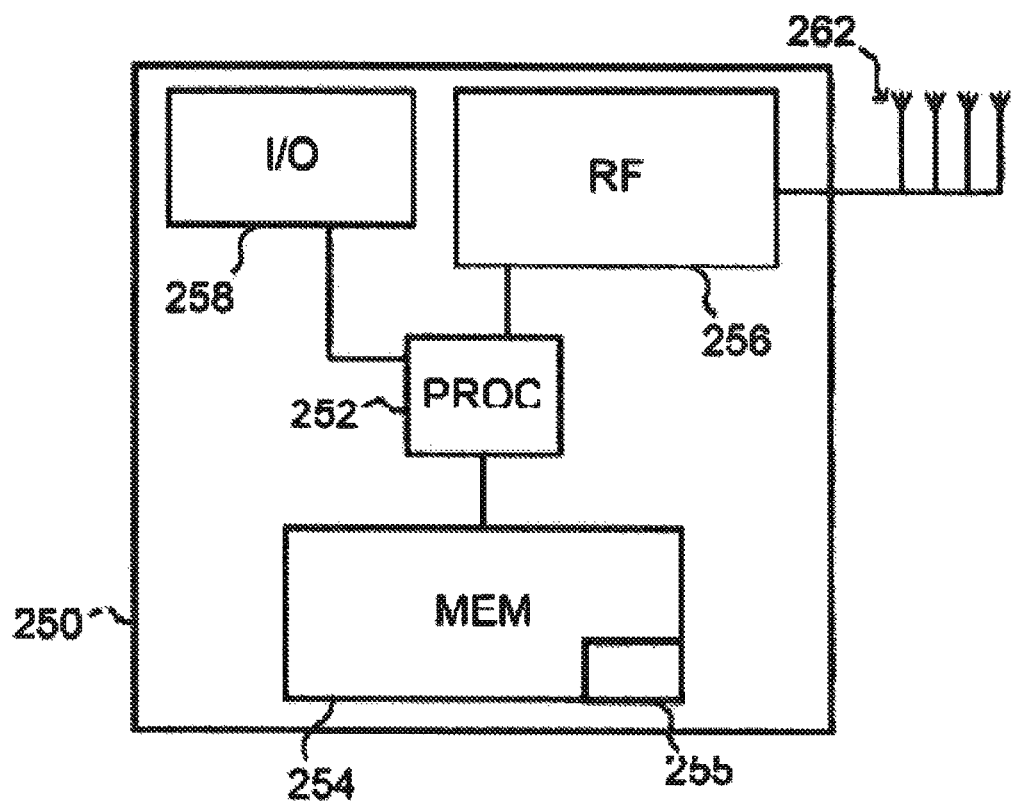
FIG. 5 is a block diagram of an example UE.

FIG. 5 is a functional block diagram that schematically illustrates UE 106, according to some embodiments. The UE 106 comprises processing means, memory means and communication means in the form of a processor 252, a memory 254 and radio circuitry 256. The UE 106 communicates with other nodes via a radio air interface with the use of one or more antennas 262. The UE 106 also comprises input/output circuitry 258 in the form of, e.g., a display, a keypad, a microphone, a camera etc.

The methods to be described below can be implemented in the base station 104 and the UE 106, respectively. In such embodiments, the method actions are realized by means of software instructions 205, 255 that are stored in the memory 204, 254 and are executable by the processor 202, 252. Such software instructions 205, 255 can be realized and provided in any suitable way, e.g. provided via the networks 120, 103 or being installed during manufacturing, as the skilled person will realize. Moreover, the memory 204, 254, the processor 202, 252, as well as the communication circuitry 206 and radio circuitry 256 comprise software and/or firmware that, in addition to being configured such that it is capable of implementing the methods to be described, is configured to control the general operation of the base station 104 and the UE 106, respectively, when operating in a cellular mobile communication system such as the system 100 in FIG. 1. However, for the purpose of avoiding unnecessary detail, no further description will be made in the present disclosure regarding this general operation.

Figure 1:
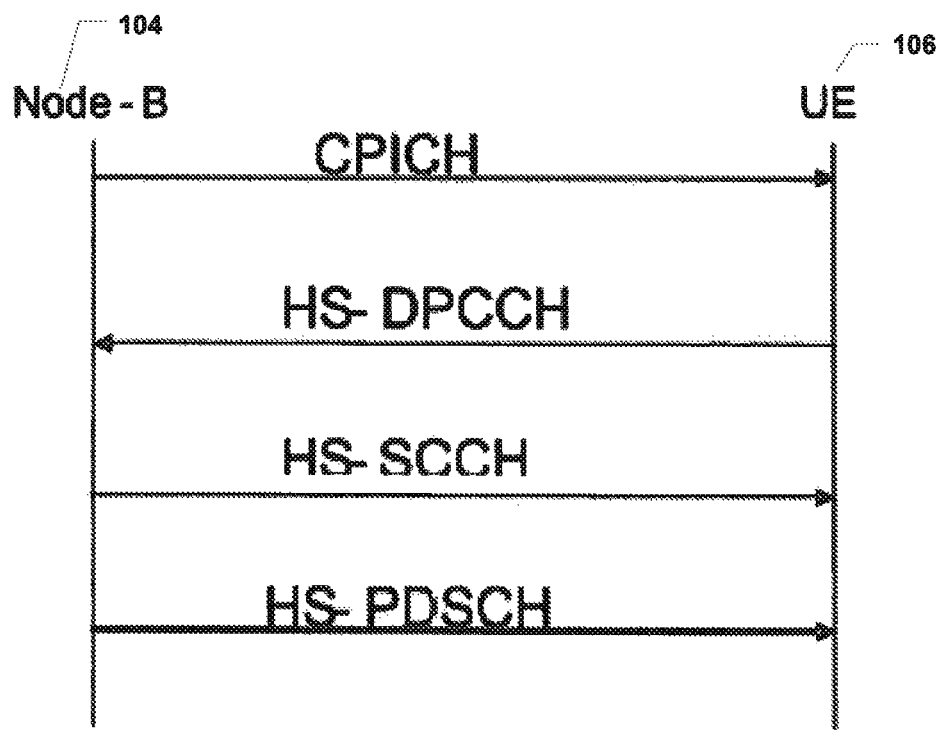
FIG. 1 is an example signaling diagram.
Figure 2:
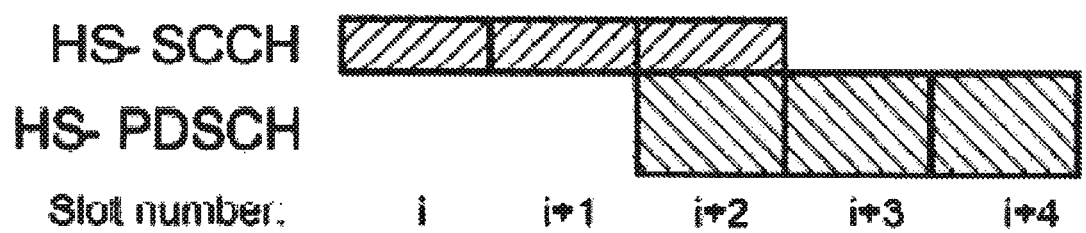
FIG. 2 illustrates a timing diagram.

Turning now to a discussion of HSPA communication between a NodeB and a UE, such as NodeB 104 and UE 106 in FIG. 1, including transmission in a HS-SCCH and a HS-PDSCH.

For a two branch MIMO system, the HS-SCCH carries information about channelization code set, CCS, modulation and transport block information etc. Since the UE needs information about the channelization code set, modulation scheme, and precoding index for setting up the weights for HS-PDSCH, the HS-SCCH is divided to two parts (part I and part II).

Part I consists of 12 bits, which conveys information about channelization code set (7 bits), modulation (3 bits), and PCI (2 bits). RI is implicitly informed through the modulation bits. That is, in summary, Part I (Total of 12 bits): channelization code set (7 bits), modulation (3 bits), precoding index information (2 bits). Part II consists of 28 or 36 bits: 28 for single stream and 36 for dual stream.

Similar to a two branch MIMO, a four branch MIMO system HS-SCCH structure consist of two parts. Since it has been decided to use two code words, it is not anticipated any change in the part II structure.

The part I structure need to contain the following information: CCS (7 bits), RI (i.e., number of transport blocks) (2 bits), modulation information (MI) (e.g., modulation scheme information) (2+2=4 bits), and PCI (4 bits). Hence in general there is a need for 7+2+2*2+4=17 bits in such a direct approach. It is to be noted that in the direct approach, rank information and modulation information are reported independently.

Figure 6:
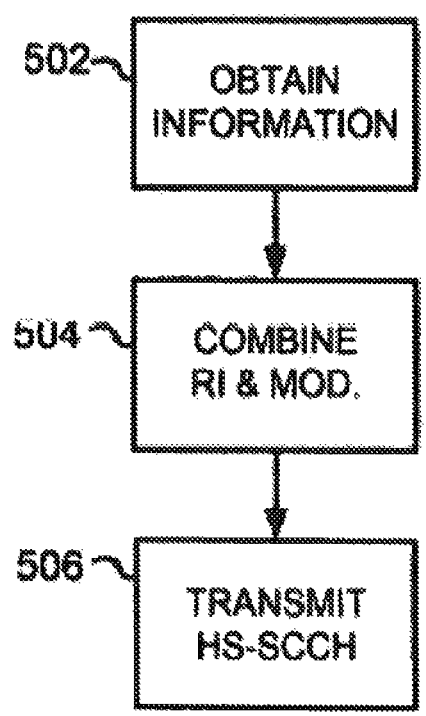
FIG. 6 is a flow chart illustrating a base station process according to some embodiments.

In a proposed approach, RI and MI are coupled so that the number of reported bits is reduced. That is, RI and MI are jointly encoded using five (5) bits. That is, a five bits of information is used to identify RI and MI as opposed to 7 bits of information. This approach is illustrated in a flow chart in FIG. 6. An obtaining step 502 comprises obtaining rank information and information about modulation, a combining step 504 comprises combining the rank information (RI) and modulation information (MI) into a bit pattern and a transmission step 506 comprises transmitting the combined rank and modulation information in a HS-SCCH. That is, for example, in step 504, five bits are used to encode both the RI and MI, such that the five bit value maps to a particular RI and MI pair.

Figure 7:
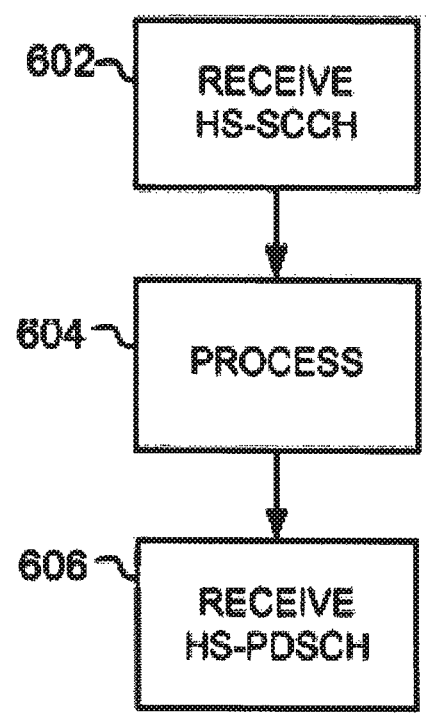
FIG. 7 is a flow chart illustrating a UE process according to some embodiments.

A corresponding method in a UE is illustrated in the flow chart of FIG. 7. The method comprises, in a reception step 602, receiving rank and modulation information in a HS-SCCH. Processing of this information takes place in a processing step 604 where the received information is de-combined. At least partly depending on the outcome of the de-coupling, data is then received in a reception step 606 in a HS-PDSCH downlink channel.

In other words, in the proposed approach, instead of reporting RI and MI separately, a NodeB reports RI and MI jointly (i.e., the RI and MI are combined into one field of five bit length) so that total number of bits is reduced. That is, the HS-SCCH part 1 consists of: CCS (7 bits); RI+MI (5 bits); and PCI (4 bits), for a total of sixteen (16) bits.

Table 1 shows one bit mapping example for such an approach. In total for part 1, 16 bits are needed and the power can be reduced by 0.35 dB in comparison with the direct approach where 17 bits are reported.

TABLE 1

| Bit Pattern | RI | Modulation-I | Modulation-II |
|---|---|---|---|
| 00000 | 1 | QPSK | NA |
| 00001 | 1 | 16 QAM | NA |
| 00010 | 1 | 64 QAM | NA |
| 00011 | 2 | QPSK | QPSK |
| 00100 | 2 | QPSK | 16 QAM |
| 00101 | 2 | QPSK | 64 QAM |
| 00110 | 2 | 16 QAM | QPSK |
| 00111 | 2 | 16 QAM | 16 QAM |
| 01000 | 2 | 16 QAM | 64 QAM |
| 01001 | 2 | 64 QAM | QPSK |
| 01010 | 2 | 64 QAM | 16 QAM |
| 01011 | 2 | 64 QAM | 64 QAM |
| 01100 | 3 | QPSK | QPSK |
| 01101 | 3 | QPSK | 16 QAM |
| 01110 | 3 | QPSK | 64 QAM |
| 01111 | 3 | 16 QAM | QPSK |
| 10000 | 3 | 16 QAM | 16 QAM |
| 10001 | 3 | 16 QAM | 64 QAM |
| 10010 | 3 | 64 QAM | QPSK |
| 10011 | 3 | 64 QAM | 16 QAM |
| 10100 | 3 | 64 QAM | 64 QAM |
| 10101 | 4 | QPSK | QPSK |
| 10110 | 4 | QPSK | 16 QAM |
| 10111 | 4 | QPSK | 64 QAM |
| 11000 | 4 | 16 QAM | QPSK |
| 11001 | 4 | 16 QAM | 16 QAM |
| 11010 | 4 | 16 QAM | 64 QAM |
| 11011 | 4 | 64 QAM | QPSK |
| 11100 | 4 | 64 QAM | 16 QAM |
| 11101 | 4 | 64 QAM | 64 QAM |
| 11110 | NA | NA | NA |
| 11111 | NA | NA | NA |

Rate Matching of HS-SCCH Part 1

From the above table it can be seen that the first part I, carries information about CCS (7 bits), RI and MI (5 bits)m and PCI (4 bits) used in the subsequent HS-PDSCH subframe for the addressed user terminal (UE). The UE identity may also be signaled in Part I through a UE-specific mask applied to the part I encoded sequence. The coding scheme of part 1 is illustrated in FIG. 8.

Figure 8:
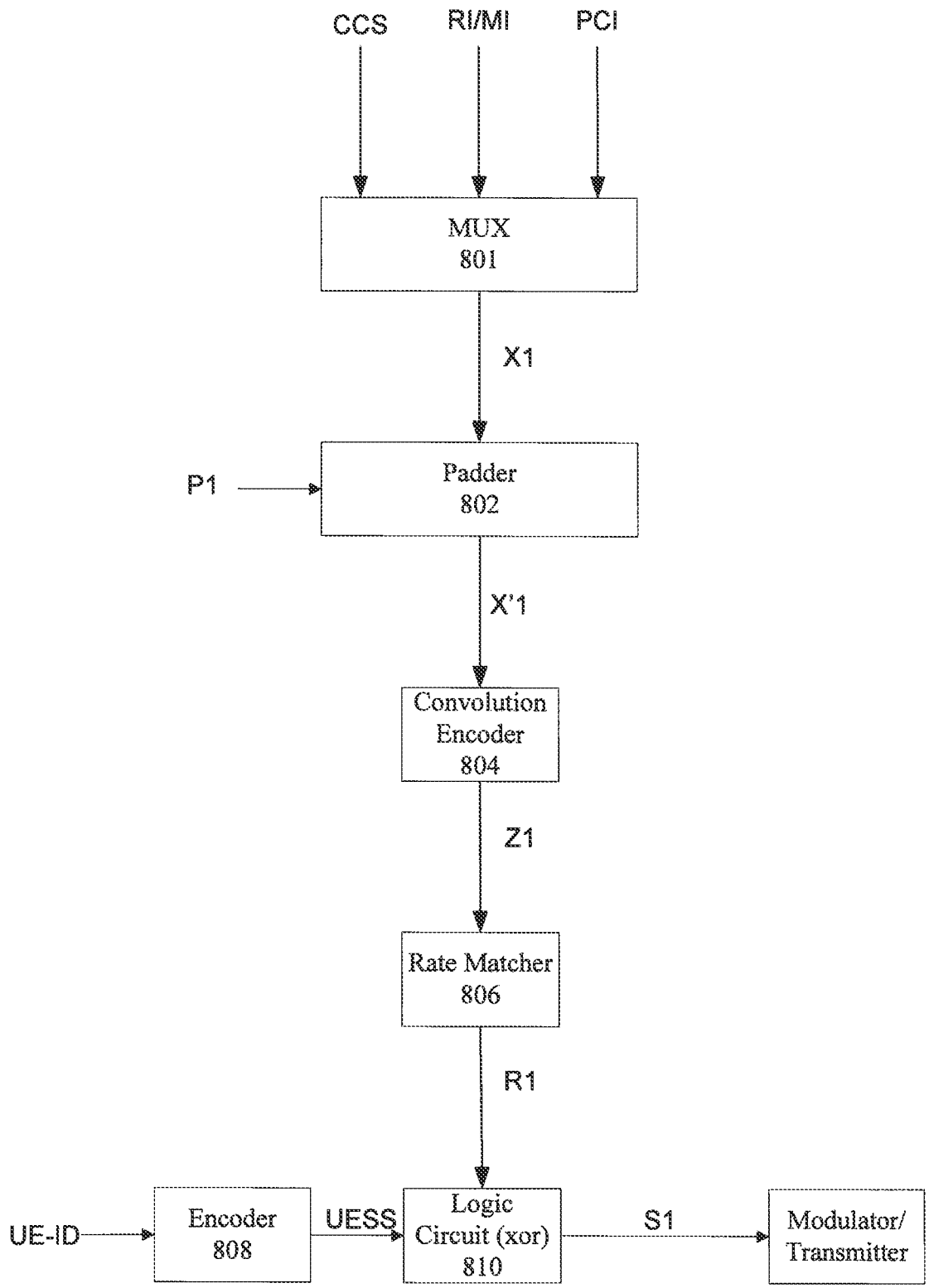
FIG. 8 is a block diagram illustrating an example encoding scheme.

As showing in FIG. 8, the part 1 information (i.e., CCS (7 bits), RI/MI (5 bits) and precoding weight information (PCI) (4 bits) are multiplexed by multiplexer 801 to produce bit sequence X1 (16 bits). X1 is then padded by padder 802 with bit sequence P1 (P=8 bits) to produce bit sequence X'1 (X'1=24 bits). X'1 is then encoded by a (40,16) punctured convolutional code. That is, X'1 is encoded by a convolutional encoder 804 to convolutionally encode X'1 to produce encoded bits Z1. Depending on the rate of the convolutional encoder 804, Z1 may be 48 or 72. For example, when the rate is 1/2, Z1=48 bits and when the rate is 1/3, then Z1=72 bits. The encoded bits Z1 are then punctured by a rate matcher 806 to produce bit sequence R1, where R1 is 40 bits in length. These encoded bits R1 are bit-masked with a UE specific sequence (UESS) (which may be generated by an encoder 808 that encodes a 16-bit UE ID using a (40, 16) punctured convolutional code) to produce a 40 bit sequence S1 (S1=40 bits). That is, UESS and R1 may be XORd by a logic circuit 810. S1 is then spread by spreading factor 128, QPSK modulated, and transmitted in one slot. Further details are provided below.

In one embodiment, when the rate is 1/2 and the generator polynomials are [561 753], the following puncturing pattern is used by the rate matcher 806: [4,10, 16, 22, 28, 34, 40, and 46]. That is, bits 4,10,16,22,28,34,40, and 46 are removed from Z1 by rate matcher 806 to produce R1. This embodiment is referred to as "option 1 (OPT1)."

In another embodiment, when the rate is 1/2 and the generator polynomials are [561 753], the following puncturing pattern is used by the rate matcher 806: [1, 2, 4, 8, 42, 45, 47 and 48]. This embodiment is referred to as "option 2 (OPT2)."

In yet another embodiment, when the rate is 1/3 and the generator polynomials are [557 663 711], the following puncturing pattern is used by the rate matcher 806: [2, 5, 7, 9, 11, 14, 16, 18, 20, 23, 25, 27, 29, 32, 34, 36, 38, 41, 43, 45, 47, 50, 52, 54, 56, 59, 61, 63, 65, 68, 70, 72]. This embodiment is referred to as "option 3 (OPT3)."

Figure 9:
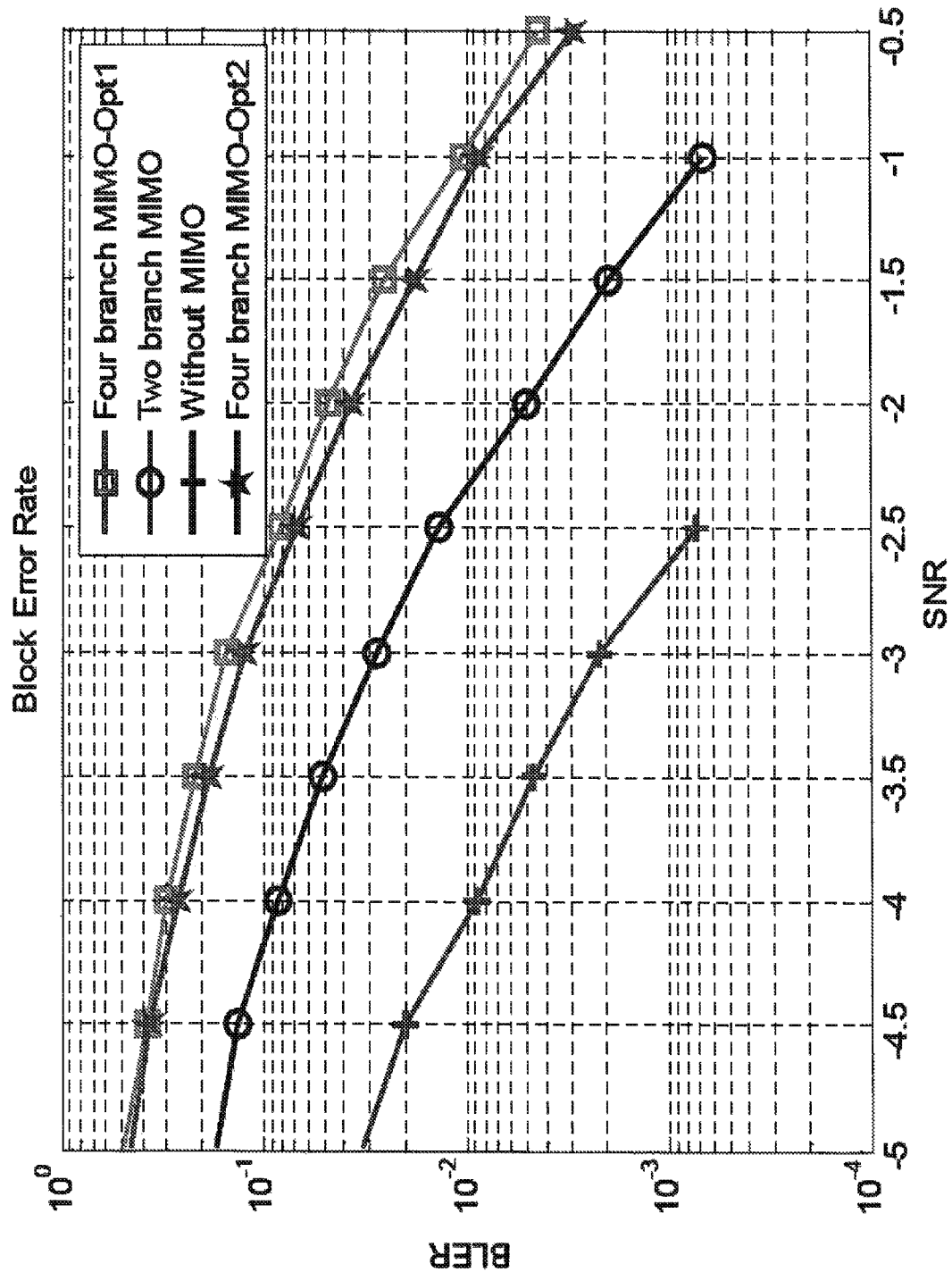
FIGS. 9 and 10 show simulation results for various options.
Figure 10:
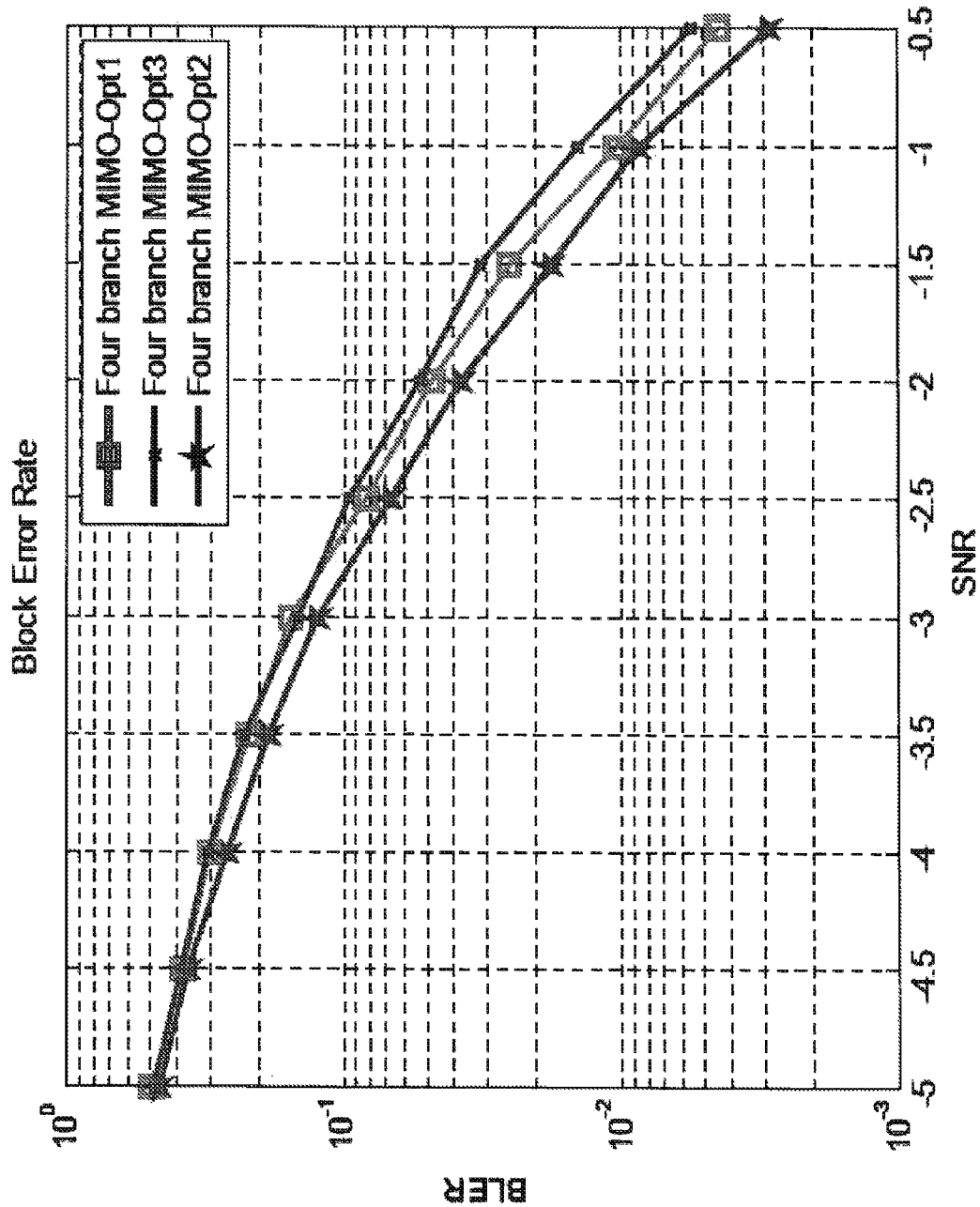

FIGS. 9 and 10 show the simulation results for options 1, 2 and 3 as well as other options.

Other Exemplary Embodiments

As discussed above, an HS-SCCH type 4 is used when the UE is configured in MIMO mode with four transmit antennas. If one transport block is transmitted on the associated HS-PDSCH(s) or an HS-SCCH order is transmitted, the following information is transmitted by means of the HS-SCCH type 3 physical channel:

Channelization-code-set information (7 bits): xccs,1, xccs,2, . . . , xccs,7

Modulation scheme and number of transport xms,1, xms,2, xms,3, xms,4, xms,5 blocks information (5 bits):

Precoding weight information (4 bits): xpwipb,1, xpwipb,2, xpwipb,3, xpwipb,4

Transport-block size information (6 bits): xtbspb,1, xtbspb,2, . . . , xtbspb,6

Hybrid-ARQ process information (4 bits): xhap,1, xhap,2, . . . , xhap,4

Redundancy and constellation version (2 bits): xrvpb,1, xrvpb,2

UE identity (16 bits): xue,1, xue,2, . . . , xue,16.

HS-SCCH orders are commands sent to the UE using HS-SCCH. No HS-PDSCH is associated with HS-SCCH orders. In some embodiments, the following information is transmitted by means of the HS-SCCH order physical channel: (1) Extended order type (2 bits) (xeodt,1 and xeodt,2); (2) Order type (3 bits) (xodt,1, xodt,2, and xodt,3); (3) Order (3 bits) (xord,1, xord,2, and xord,3); and (4) UE identity (16 bits) (xue,1, xue,2, xue,16).

In some embodiments, for an HS-SCCH order: (1) xccs,1, xccs,2, xccs,7, xms,1, xms,2, xms,3, xms,4, xms,5, xpwipb,1, xpwipb,2, xpwipb,3, xpwipb,4 shall be set to '11100000000000'; (2) xtbspb,1, xtbspb,2, xtbspb,4 shall be set to '1111'; (3) xtbspb,5, xtbspb,6 shall be set to xeodt,1, xeodt,2; and (4) xhap,1, xhap,2, xhap,3, xhap,4, xrvpb,1, xrvpb,2 shall be set to xodt,1, xodt,2, xodt,3, xord,1, xord,2, xord,3. Where xeodt,1, xeodt,2, xodt,1, xodt,2, xodt,3, xord, 1, xord,2, xord,3 are defined above.

In some embodiments, if more than one transport blocks are transmitted on the associated HS-PDSCHs, the following information is transmitted by means of the HS-SCCH type 4 physical channel: (1) Channelization-code-set information (7 bits): xccs,1, xccs,2, xccs,7; (2) Modulation scheme and number of transport blocks information (5 bits): xms,1, xms,2, xms,3, xms,4, xms,5; (3) Precoding weight information for the primary transport block (4 bits): xpwipb,1, xpwipb,2, xpwipb,3, xpwipb,4; (4) Transport-block size information for the primary transport block (6 bits):xtbspb,1, xtbspb,2, . . . , xtbspb,6; (5) Transport-block size information for the secondary transport block (6 bits):xtbssb,1, xtbssb,2, . . . , xtbssb, 6; (6) Hybrid-ARQ process information (4 bits):xhap,1, xhap,2, . . . , xhap,4; (7) Redundancy and constellation version for the primary transport block (2 bits):xrvpb,1, xrvpb,2; (8) Redundancy and constellation version for the secondary transport block (2 bits):xrvsb,1, xrvsb,2; and (9) UE identity (16 bits):xue,1, xue,2, . . . , xue,16.

Figure 11:
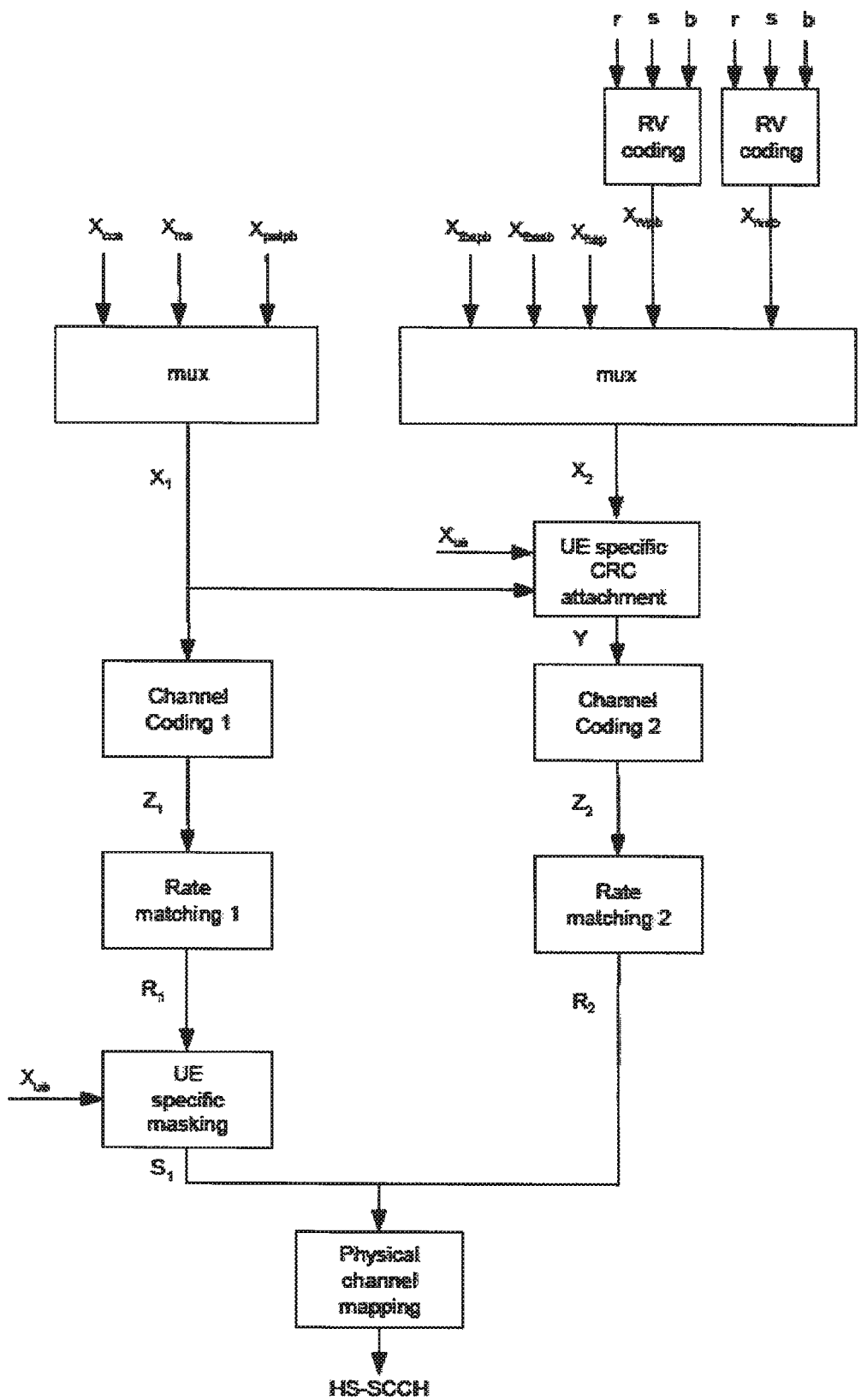
FIG. 11 is a block diagram illustrating an encoding scheme according to some embodiments.

FIG. 11 illustrates the overall coding chain for HS-SCCH type 4. Note that some information shown is not present if only one transport block is transmitted on the associated HS-PDSCH(s).

HS-SCCH Type 4 Information Field Mapping
Redundancy and Constellation Version Coding:
If four transport blocks are transmitted on the associated HS-PDSCH(s), the redundancy version (RV) parameters r, s and constellation version parameter b are coded jointly to produce the values $X_{rvpb}$ for the primary and the fourth transport blocks and $X_{rvsb}$ for the second and the third transport blocks respectively. The transmitted sequences $x_{rvpb,1}$, $x_{rvpb,2}$ and $x_{rvsp,1}$, $x_{rvsb,2}$ are the binary representations of $X_{rvpb}$ and $X_{rvsb}$, respectively, where $x_{rvpb,1}$ and $x_{rvsb,1}$ are the most significant bits (MSBs).

If three transport blocks are transmitted on the associated HS-PDSCH(s), the redundancy version (RV) parameters r, s and constellation version parameter b are coded jointly to produce the values $X_{rvpb}$ for the primary transport block and $X_{rvsb}$ for the second and the third transport blocks respectively. The transmitted sequences $x_{rvpb,1}$, $x_{rvpb,2}$ and $x_{rvsb,1}$, $x_{rvsb,2}$ are the binary representations of $X_{rvpb}$ and $X_{rvsb}$, respectively, where $x_{rvpb,1}$ and $x_{rvsb,1}$ are the MSBs.

For each of the primary transport block and a secondary transport block if two transport blocks are transmitted on the associated HS-PDSCH(s), the redundancy version (RV) parameters r, s and constellation version parameter b are coded jointly to produce the values $X_{rvpb}$ and $X_{rvsb}$ respectively. The transmitted sequences $x_{rvpb,1}$, $x_{rvpb,2}$ and $x_{rvsb,1}$, $x_{rvsb,2}$ are the binary representations of $X_{rvpb}$ and $X_{rvsb}$, respectively, where $x_{rvpb,1}$ and $x_{rvsb,1}$ are the MSBs.

For the primary transport block if only one transport block is transmitted on the associated HS-PDSCH(s), the redundancy version (RV) parameters r, s and constellation version parameter b are coded jointly to produce the value $X_{rvpb}$. The transmitted sequence $x_{rvpb,1}$, $x_{rvpb,2}$ is the binary representation of $X_{rvpb}$, where $x_{rvpb,1}$ is the MSB.

Joint coding of parameters r, s and constellation version parameter b is done according to tables 14B.3 and 14B.4 according to the modulation mode used. If $X_{rvpb}=0$ or $X_{rvsb}=0$, the UE shall treat the corresponding transport block as an initial transmission.

TABLE 14B.3

RV coding for 16 QAM and 64 QAM for HS-SCCH type 4

| $X_{rvpb}$ or $X_{rvsb}$ | $N_{sys}/N_{data} < 1/2$ | | | $N_{sys}/N_{data} \geq 1/2$ | | |
|---|---|---|---|---|---|---|
| (value) | s | r | b | s | r | b |
| 0 | 1 | 0 | 0 | 1 | 0 | 0 |
| 1 | 1 | 1 | 1 | 0 | 1 | 1 |
| 2 | 1 | 0 | 2 | 0 | 0 | 0 |
| 3 | 1 | 0 | 3 | 1 | 0 | 2 |

TABLE 14B.4

RV coding for QPSK for HS-SCCH type 4

| $X_{rvpb}$ or $X_{rvsb}$ | $N_{sys}/N_{data} < 1/2$ | | $N_{sys}/N_{data} \geq 1/2$ | |
|---|---|---|---|---|
| (value) | s | r | s | r |
| 0 | 1 | 0 | 1 | 0 |
| 1 | 1 | 1 | 0 | 1 |
| 2 | 1 | 2 | 0 | 3 |
| 3 | 1 | 3 | 1 | 2 |

Modulation Scheme and Number of Transport Blocks Mapping
The number of transport blocks transmitted on the associated HS-PDSCH(s) and the modulation scheme information are jointly coded as shown in Table 1, above.

Channelization Code-set Mapping
The channelization code-set bits $x_{ccs,1}, x_{ccs,2}, \ldots, x_{ccs,7}$ are coded according to the following:
Given P (multi-)codes starting at code O, and given the HS-SCCH number if 64QAM is configured for the UE and $x_{ms,1}$, $x_{ms,2}$, $x_{ms,3}$ is equal to "101", calculate the information-field using the unsigned binary representation of integers calculated by the expressions,
for the first three bits (code group indicator) of which $x_{ccs,1}$ is the MSB:

$$x_{ccs,1}, x_{ccs,2}, x_{ccs,3} = \min(P-1, 15-P)$$

If 64QAM is not configured for the UE, or if 64QAM is configured and $x_{ms,1}, x_{ms,2}, x_{ms,3}$ is not equal to "101", then for the last four bits (code offset indicator) of which $x_{ccs,4}$ is the MSB:

$$x_{ccs,4}, x_{ccs,5}, x_{ccs,6}, x_{ccs,7} = |O-1-\lfloor P/8 \rfloor * 15|$$

Otherwise (i.e. if 64QAM is configured for the UE and $x_{ms,1}$, $x_{ms,2}$, $x_{ms,3}$ is equal to "101"), P and O shall fulfil $|O-1-\lfloor P/8 \rfloor * 15| \mod 2 = $(HS-SCCH number) mod 2, and then $x_{ccs,4}$, $x_{ccs,5}$, $x_{ccs,6}$, $x_{ccs,dummy} = |O-1-\lfloor P/8 \rfloor * 15|$, where $x_{ccs,dummy}$ is a dummy bit that is not transmitted on HS-SCCH.

Furthermore, $x_{ccs,7}=0$ if the modulation for the secondary transport block is QPSK, and $x_{ccs,7}=1$ if the number of transport blocks=1.

The definitions of P and O are given in 3GPP TS 25.213 V11.2.0. The HS-SCCH number is given by the position in the list of HS-SCCH Channelisation Code Informations signalled by higher layers. The HS-SCCH number is associated with the code offset indicator and code group indicator as described above if 64QAM is configured for the UE and $x_{ms,1}$, $x_{ms,2}$, $x_{ms,3}$ is equal to "101".

If two transport blocks are transmitted on the associated HS-PDSCH(s), the same set of channelization codes shall be used for both transport blocks.

UE Identity Mapping

The UE identity is the HS-DSCH Radio Network Identifier (H-RNTI). This is mapped such that $x_{ue,1}$ corresponds to the MSB and $x_{ue,16}$ to the LSB.

HARQ Process Identifier Mapping

If four transport blocks are transmitted on the associated HS-PDSCH(s), the mapping relationship between the hybrid-ARQ processes and the transport blocks is such that when the HARQ-process with identifier $HAP_{pb}$ is mapped to the primary and the fourth transport block, the HARQ-process with the identifier given by $(HAP_{pb}+N_{proc}/2)\mod(N_{proc})$ shall be mapped to the second and the third transport block, where $N_{proc}$ is the number of HARQ processes configured by higher layers. The combination of HARQ-processes is indicated by the hybrid-ARQ process information (4 bits) $x_{hap,1}$, $x_{hap,2}$, $x_{hap,3}$, $x_{hap,4}$ which are the unsigned binary representation of $HAP_{pb}$ where $x_{hap,1}$ is MSB.

If three transport blocks are transmitted on the associated HS-PDSCH(s), the mapping relationship between the hybrid-ARQ processes and the transport blocks is such that when the HARQ-process with identifier $HAP_{pb}$ is mapped to the primary transport block, the HARQ-process with the identifier given by $(HAP_{pb}+N_{proc}/2)\mod(N_{proc})$ shall be mapped to the second and the third transport block, where $N_{proc}$ is the number of HARQ processes configured by higher layers. The combination of HARQ-process is indicated by the hybrid-ARQ process information (4 bits) $x_{hap,1}$, $x_{hap,2}$, $x_{hap,3}$, $x_{hap,4}$ which are the unsigned binary representation of $HAP_{pb}$ where $x_{hap,1}$ is MSB.

If two transport blocks are transmitted on the associated HS-PDSCH(s), the mapping relationship between the hybrid-ARQ processes and the transport blocks is such that when the HARQ-process with identifier $HAP_{pb}$ is mapped to the primary transport block, the HARQ-process with the identifier given by $(HAP_{pb}+N_{proc}/2)\mod(N_{proc})$ shall be mapped to the secondary transport block, where $N_{proc}$ is the number of HARQ processes configured by higher layers. The combination of HARQ-processes is indicated by the hybrid-ARQ process information (4 bits) $x_{hap,1}$, $x_{hap,2}$, $x_{hap,3}$, $x_{hap,4}$ which are the unsigned binary representation of $HAP_{pb}$ where $x_{hap,1}$ is MSB.

If only one transport block is transmitted on the associated HS-PDSCH(s), the above mapping is ignored and the hybrid-ARQ process information $x_{hap,1}$, $x_{hap,2}$, $x_{hap,3}$, $x_{hap,4}$ is the unsigned binary representation of the HARQ process identifier where $x_{hap,1}$ is MSB.

Transport Block Size Index Mapping

The transport-block size information $x_{tbspb,1}$, $x_{tbspb,2}$, ..., $x_{tbspb,6}$ is the unsigned binary representation of the transport block size index for the primary transport block, where $x_{tbspb,1}$ is the MSB.

If two transport blocks are transmitted on the associated HS-PDSCH(s), the transport-block size information $x_{tbssb,1}$, $x_{tbssb,2}$, ..., $x_{tbssb,6}$ is the unsigned binary representation of the transport block size index for the secondary transport block, where $x_{tbssb,1}$ is the MSB.

If three transport blocks are transmitted on the associated HS-PDSCH(s), the transport-block size information $x_{tbspb,1}$, $x_{tbspb,2}$, ..., $x_{tbspb,6}$ is the unsigned binary representation of the transport block size index for the primary transport block, where $x_{tbspb,1}$ is the MSB and the transport-block size information $x_{tbssb,1}$, $x_{tbssb,2}$, ..., $x_{tbssb,6}$ is the unsigned binary representation of the transport block size index for the second and the third transport blocks, where $x_{tbssb,1}$ is the MSB.

If four transport blocks are transmitted on the associated HS-PDSCH(s), the transport-block size information $x_{tbspb,1}$, $x_{tbspb,2}$, ..., $x_{tbspb,6}$ is the unsigned binary representation of the transport block size index for the primary and the fourth transport blocks, where $x_{tbspb,1}$ is the MSB and the transport-block size information $x_{tbssb,1}$, $x_{tbssb,2}$, ..., $x_{tbssb,6}$ is the unsigned binary representation of the transport block size index for the second and the third transport blocks, where $x_{tbssb,1}$ is the MSB.

Precoding Weight Information Mapping

The precoding weight information $x_{pwipb,1}$, $x_{pwipb,2}$, $x_{pwipb,3}$, $x_{pwipb,4}$ is mapped according to Table 14B.6. The quantity $W_n^{\{s\}}$ denotes the matrix defined by the columns given by the set $\{s\}$ from the expression $W_n = I - 2u_n u_n^H / u_n^H u_n$ where I is the 4×4 identity matrix, H is the Hermitian Operation, and the vector $u_n$ is given by Table 14B.6.

TABLE 14B.6

| | | \multicolumn{4}{c}{precoding weight information} | | | |
|---|---|---|---|---|---|
| $x_{pwipb,1}$, $x_{pwipb,2}$, $x_{pwipb,3}$, $x_{pwipb,4}$ | $u_n$ | \multicolumn{4}{c}{Number of transport blocks} | | | |
| | | 1 | 2 | 3 | 4 |
| 0000 | $u_0 = [1\ -1\ -1\ -1]^T$ | $W_0^{\{1\}}$ | $W_0^{\{14\}}/\sqrt{2}$ | $W_0^{\{124\}}/\sqrt{3}$ | $W_0^{\{1234\}}/2$ |
| 0001 | $u_1 = [1\ -j\ 1\ j]^T$ | $W_1^{\{1\}}$ | $W_1^{\{12\}}/\sqrt{2}$ | $W_1^{\{123\}}/\sqrt{3}$ | $W_1^{\{1234\}}/2$ |
| 0010 | $u_2 = [1\ 1\ -1\ 1]^T$ | $W_2^{\{1\}}$ | $W_2^{\{12\}}/\sqrt{2}$ | $W_2^{\{123\}}/\sqrt{3}$ | $W_2^{\{3214\}}/2$ |
| 0011 | $u_3 = [1\ j\ 1\ -j]^T$ | $W_3^{\{1\}}$ | $W_3^{\{12\}}/\sqrt{2}$ | $W_3^{\{123\}}/\sqrt{3}$ | $W_3^{\{3214\}}/2$ |
| 0100 | $u_4 = [1\ (-1-j)/\sqrt{2}\ -j\ (1-j)/\sqrt{2}]^T$ | $W_4^{\{1\}}$ | $W_4^{\{14\}}/\sqrt{2}$ | $W_4^{\{124\}}/\sqrt{3}$ | $W_4^{\{1234\}}/2$ |
| 0101 | $u_5 = [1\ (1-j)/\sqrt{2}\ j\ (-1-j)/\sqrt{2}]^T$ | $W_5^{\{1\}}$ | $W_5^{\{14\}}/\sqrt{2}$ | $W_5^{\{124\}}/\sqrt{3}$ | $W_5^{\{1234\}}/2$ |
| 0110 | $u_6 = [1\ (1+j)/\sqrt{2}\ -j\ (-1+j)/\sqrt{2}]^T$ | $W_6^{\{1\}}$ | $W_6^{\{13\}}/\sqrt{2}$ | $W_6^{\{134\}}/\sqrt{3}$ | $W_6^{\{1324\}}/2$ |
| 0111 | $u_7 = [1\ (-1+j)/\sqrt{2}\ j\ (1+j)/\sqrt{2}]^T$ | $W_7^{\{1\}}$ | $W_7^{\{14\}}/\sqrt{2}$ | $W_7^{\{134\}}/\sqrt{3}$ | $W_7^{\{1324\}}/2$ |
| 1000 | $u_8 = [1\ -1\ 1\ 1]^T$ | $W_8^{\{1\}}$ | $W_8^{\{12\}}/\sqrt{2}$ | $W_8^{\{124\}}/\sqrt{3}$ | $W_8^{\{1234\}}/2$ |
| 1001 | $u_9 = [1\ -j\ -1\ -j]^T$ | $W_9^{\{1\}}$ | $W_9^{\{14\}}/\sqrt{2}$ | $W_9^{\{134\}}/\sqrt{3}$ | $W_9^{\{1234\}}/2$ |
| 1010 | $u_{10} = [1\ 1\ 1\ -1]^T$ | $W_{10}^{\{1\}}$ | $W_{10}^{\{13\}}/\sqrt{2}$ | $W_{10}^{\{123\}}/\sqrt{3}$ | $W_{10}^{\{1324\}}/2$ |
| 1011 | $u_{11} = [1\ j\ -1\ j]^T$ | $W_{11}^{\{1\}}$ | $W_{11}^{\{13\}}/\sqrt{2}$ | $W_{11}^{\{134\}}/\sqrt{3}$ | $W_{11}^{\{1324\}}/2$ |
| 1100 | $u_{12} = [1\ -1\ -1\ 1]^T$ | $W_{12}^{\{1\}}$ | $W_{12}^{\{12\}}/\sqrt{2}$ | $W_{12}^{\{123\}}/\sqrt{3}$ | $W_{12}^{\{1234\}}/2$ |
| 1101 | $u_{13} = [1\ -1\ 1\ -1]^T$ | $W_{13}^{\{1\}}$ | $W_{13}^{\{13\}}/\sqrt{2}$ | $W_{13}^{\{123\}}/\sqrt{3}$ | $W_{13}^{\{1324\}}/2$ |

TABLE 14B.6-continued precoding weight information

| $x_{pwipb,1}$, $x_{pwipb,2}$, $x_{pwipb,3}$, $x_{pwipb,4}$, $u_n$ | | Number of transport blocks | | | |
|---|---|---|---|---|---|
| | | 1 | 2 | 3 | 4 |
| 1110 | $u_{14} = [1\ 1\ -1\ -1]^T$ | $W_{14}\{1\}$ | $W_{14}\{13\}/\sqrt{2}$ | $W_{14}\{123\}/\sqrt{3}$ | $W_{14}\{3214\}/2$ |
| 1111 | $u_{15} = [1\ 1\ 1\ 1]^T$ | $W_{15}\{1\}$ | $W_{15}\{12\}/\sqrt{2}$ | $W_{15}\{123\}/\sqrt{3}$ | $W_{15}\{1234\}/2$ |

Multiplexing of HS-SCCH Type 4 Information

The channelization-code-set information $x_{ccs,1}, x_{ccs,2}, \ldots, x_{ccs,7}$, modulation-scheme and number of transport blocks information $x_{ms,1}, x_{ms,2}, x_{ms,3}, x_{ms,4}, x_{ms,5}$ and precoding weight information $x_{pwipb,1}, x_{pwipb,2}, x_{pwipb,3}, x_{pwipb,4}$ are multiplexed together. This gives a sequence of bits $x_{1,1}, x_{1,2}, \ldots, x_{1,16}$, where $x_{1,i} = x_{ccs,i}$ i=1, 2, ..., 7
$x_{1,i} = x_{ms,i-7}$ i=8, 9, 10, 11, 12
$x_{1,i} = x_{pwipb,i-12}$ i=13, 14, 15, 16

If one transport block is transmitted on the associated HS-PDSCH(s), the transport-block-size information $x_{tbspb,1}, x_{tbspb,2}, \ldots, x_{tbspb,6}$, Hybrid-ARQ-process information $x_{hap,1}, x_{hap,2}, \ldots, x_{hap,4}$, and redundancy-version information $x_{rvpb,1}, x_{rvpb,2}$ are multiplexed together. This gives a sequence of bits $x_{2,1}, x_{2,2}, \ldots, x_{2,12}$ where $x_{2,i} = x_{tbs,I}$ i=1, 2, ..., 6
$x_{2,i} = x_{hap,i-6}$ i=7, 8, ..., 10
$x_{2,i} = x_{rv,i-10}$ i=11, 12

If two transport blocks are transmitted on the associated HS-PDSCHs, the transport-block-size information for the primary transport block $x_{tbspb,1}, x_{tbspb,2}, \ldots, x_{tbspb,6}$, transport-block-size information for the secondary transport block $x_{tbssb,i}, x_{tbssb,2}, \ldots, x_{tbssb,6}$, Hybrid-ARQ-process information $x_{hap,1}, x_{hap,2}, \ldots, x_{hap,4}$, redundancy-version information for the primary transport block $x_{rvpb,1}, x_{rvpb,2}$, and redundancy-version information for the secondary transport block $x_{rvsb,1}, x_{rvsb,2}$ are multiplexed together. This gives a sequence of bits $x_{2,1}, x_{2,2}, x_{2,20}$ where $x_{2,i} = x_{tbspb,i}$ i=1, 2, ..., 6
$x_{2,i} = x_{tbssb,i-6}$ i=7, 8, ..., 12
$x_{2,i} = x_{hap,i-12}$ i=13, 14, ..., 16
$x_{2,i} = x_{rvpb,i-16}$ i=17, 18
$x_{2,i} = x_{rvsb,i-18}$ i=19, 20

If three transport blocks are transmitted on the associated HS-PDSCHs, the transport-block-size information for the primary transport block $x_{tbspb,1}, x_{tbspb,2}, \ldots, x_{tbspb,6}$, transport-block-size information for the second and the third transport blocks $x_{tbssb,1}, x_{tbssb,2}, \ldots, x_{tbssb,6}$, Hybrid-ARQ-process information $x_{hap,1}, x_{hap,2}, \ldots, x_{hap,4}$, redundancy-version information for the primary transport block $x_{rvpb,1}, x_{rvpb,2}$, and redundancy-version information for the second and the third transport blocks $x_{rvsb,1}, x_{rvsb,2}$ are multiplexed together. This gives a sequence of bits $x_{2,1}, x_{2,2}, \ldots, x_{2,20}$ where $x_{2,i} = x_{tbspb,i}$ i=1, 2, ..., 6
$x_{2,i} = x_{tbssb,i-6}$ i=7, 8, ..., 12
$x_{2,i} = x_{hap,i-12}$ i=13, 14, ..., 16
$x_{2,i} = x_{rvpb,i-16}$ i=17, 18
$x_{2,i} = x_{rvsb,i-18}$ i=19, 20

If four transport blocks are transmitted on the associated HS-PDSCHs, the transport-block-size information for the primary and the fourth transport blocks $x_{tbspb,1}, x_{tbspb,2}, \ldots, x_{tbspb,6}$, transport-block-size information for the second and the third transport blocks $x_{tbssb,1}, x_{tbssb,2}, \ldots, x_{tbssb,6}$, Hybrid-ARQ-process information $x_{hap,1}, x_{hap,2}, \ldots, x_{hap,4}$, redundancy-version information for the primary and the fourth transport blocks $x_{rvpb,1}, x_{rvpb,2}$, and redundancy-version information for the second and the third transport blocks $x_{rvsb,1}, x_{rvsb,2}$ are multiplexed together. This gives a sequence of bits $x_{2,1}, x_{2,2}, \ldots, x_{2,20}$ where $x_{2,i} = x_{tbspb,i}$ i=1, 2, ..., 6
$x_{2,i} = x_{tbssb,i-6}$ i=7, 8, ..., 12
$x_{2,i} = x_{hap,i-12}$ i=13, 14, ..., 16
$x_{2,i} = x_{rvpb,i-16}$ i=17, 18
$x_{2,i} = x_{rvsb,i-18}$ i=19, 20

CRC Attachment for HS-SCCH Type 4

If one transport block is transmitted on the associated HS-PDSCH(s), from the sequence of bits $x_{1,1}, x_{1,2}, \ldots, x_{1,12}, x_{2,1}, x_{2,2}, \ldots, x_{2,12}$ a 16-bit CRC is calculated. This gives a sequence of bits $c_1, c_2, \ldots, c_{16}$, where $c_k = p_{im(17-k)}$ k=1, 2, ..., 16.

This sequence of bits is then masked with the UE Identity $x_{ue,1}, x_{ue,2}, \ldots, x_{ue,16}$ and then appended to the sequence of bits $x_{2,1}, x_{2,2}, \ldots, x_{2,12}$ to form the sequence of bits $y_1, y_2, \ldots, y_{28}$, where $y_{i=x2,i}$ i=1, 2, ..., 12
$y_i = (c_{i-12} + x_{ue,i-12}) \bmod 2$ i=13, 14, ..., 28

If more than one transport blocks are transmitted on the associated HS-PDSCHs, from the sequence of bits $x_{1,1}, x_{1,2}, \ldots, x_{1,16}, x_{2,1}, x_{2,2}, \ldots, x_{2,20}$ a 16-bit CRC is calculated. This gives a sequence of bits $c_1, c_2, \ldots, c_{16}$, where $c_k = p_{im(17-k)}$ k=1, 2, ..., 16

This sequence of bits is then masked with the UE Identity $x_{ue,1}, x_{ue,2}, \ldots, x_{ue,16}$ and then appended to the sequence of bits $x_{2,1}, x_{2,2}, \ldots, x_{2,20}$ to form the sequence of bits $y_1, y_2, \ldots, y_{36}$, where $y_i = x_{2,i}$ i=1, 2, ..., 20
$y_i = (c_{i-20} + x_{ue,i-20}) \bmod 2$ i=21, 22, ..., 36

Channel Coding for HS-SCCH Type 4

Rate 1/2 convolutional coding is applied to the sequence of bits $x_{1,1}, x_{1,2}, \ldots, x_{16}$. This gives a sequence of bits $z_{1,1}, z_{1,2}, \ldots, z_{1,48}$.

If one transport block is transmitted on the associated HS-PDSCH(s), rate 1/3 convolutional coding is applied to the sequence of bits $y_1, y_2, \ldots, y_{28}$. This gives a sequence of bits $z_{2,1}, z_{2,2}, \ldots, z_{2,108}$.

If two transport blocks are transmitted on the associated HS-PDSCHs, rate 1/3 convolutional coding is applied to the sequence of bits $y_1, y_2, \ldots, y_{36}$. This gives a sequence of bits $z_{2,1}, z_{2,2}, \ldots, z_{2,132}$.

Note that the coded sequence lengths result from the termination of K=9 convolutional coding being fully applied.

Rate Matching for HS-SCCH Type 4

From the input sequence $z_{1,1}, z_{1,2}, \ldots, z_{1,48}$ the bits $z_{1,1}, z_{1,2}, z_{1,4}, z_{1,8}, z_{1,42}, z_{1,45}, z_{1,47}, z_{1,48}$ are punctured to obtain the output sequence $r_{1,1}, r_{1,2} \ldots r_{1,40}$.

If one transport block is transmitted on the associated HS-PDSCH(s), from the input sequence $z_{2,1}, z_{2,2}, \ldots, z_{2,108}$ the bits $z_{2,1}, z_{2,2}, z_{2,3}, z_{2,4}, z_{2,5}, z_{2,6}, z_{2,7}, z_{2,8}, z_{2,12}, z_{2,14}, z_{2,15}, z_{2,24}, z_{2,42}, z_{2,48}, z_{2,63}, z_{2,66}, z_{2,93}, z_{2,96}, z_{2,98}, z_{2,99}, z_{2,101}, z_{2,102}, z_{2,103}, z_{2,104}, z_{2,105}, z_{2,106}, z_{2,107}, z_{2,108}$ are punctured to obtain the output sequence $r_{2,1}, r_{2,2} \ldots r_{2,80}$.

If two transport blocks are transmitted on the associated HS-PDSCHs, from the input sequence $z_{2,1}, z_{2,2}, \ldots, z_{2,132}$ the bits $z_{2,1}, z_{2,2}, z_{2,3}, z_{2,4}, z_{2,5}, z_{2,6}, z_{2,7}, z_{2,8}, z_{2,10}, z_{2,11}, z_{2,13}, z_{2,14}, z_{2,16}, z_{2,19}, z_{2,22}, z_{2,25}, z_{2,28}, z_{2,31}, z_{2,34}, z_{2,37}, z_{2,40}, z_{2,43}, z_{2,46}, z_{2,49}, z_{2,55}, z_{2,61}, z_{2,72}, z_{2,78}, z_{2,84}, z_{2,87}, z_{2,90}, z_{2,93}, z_{2,96}, z_{2,99}, z_{2,102}, z_{2,105}, z_{2,108}, z_{2,111}, z_{2,114}, z_{2,117}, z_{2,119}, z_{2,120}, z_{2,122}, z_{2,123}, z_{2,125}, z_{2,126}, z_{2,127}, z_{2,128}, z_{2,129}, z_{2,130}, z_{2,131}, z_{2,132}$ are punctured to obtain the output sequence $r_{2,1}, r_{2,2} \ldots r_{2,80}$.

Figure 12:
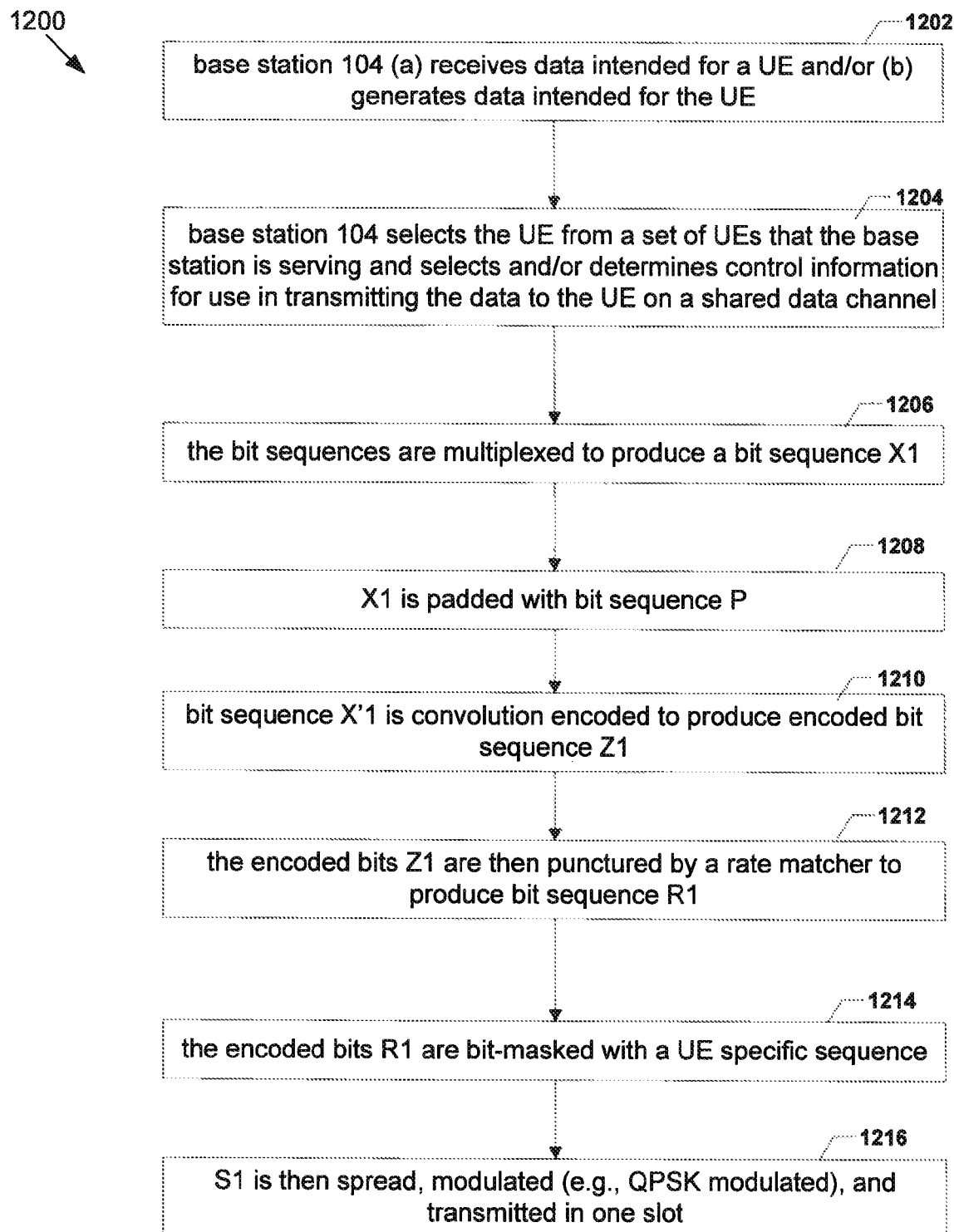
FIG. 12 is a flow chart illustrating a process according to some embodiments.

Referring now to FIG. 12, FIG. 12 is a flow chart illustrating a process 1200 according to some embodiments, which process may be performed by base station 104. Process 1200 may begin in step 1202, where base station 104 (a) receives data intended for a UE and/or (b) generates data intended for the UE. In step 1204, base station 104 selects the UE from a set of UEs that the base station is serving and selects and/or determines control information for use in transmitting the data to the UE on a shared data channel (e.g., HS-DSCH). The control information selected/determined may include: CCS, RI, MI, and PCI, where each has a corresponding bit sequence. In step 1206, the bit sequences are multiplexed to produce a bit sequence X1, (in some embodiments X1 is sixteen bits). In some embodiments, the first portion of X1 (e.g., the first seven bits of X1) identify a CCS, the next portion of X1 (e.g., the next five bits) identify an RI/MI pair, and the last portion of X1 (e.g., the next four bits of X1) identify a PCI. Next (step 1208), X1 is padded with bit sequence P (in some embodiments P is eight bits in length) to produce bit sequence X'1. Next (step 1210) bit sequence X'1 is convolution encoded to produce encoded bit sequence Z1. Depending on the length of X'1 and on the rate of the convolutional encoder, Z1 may be, for example, 48 or 72 bits. For example, when X'1 is 24 bits and the rate is 1/2, then Z1=48 bits and when X'1 is 24 bits and the rate is 1/3, then Z1=72 bits. Next (step 1212) the encoded bits Z1 are then punctured by a rate matcher to produce bit sequence R1 (in some embodiments Z1 is punctured such that R1 is 40 bits in length). Next (step 1214) the encoded bits R1 are bit-masked with a UE specific sequence (UESS) (which may be generated by an encoder that encodes a 16-bit UE ID using a (40, 16) punctured convolutional code) to produce a bit sequence S1 (in some embodiments S1=40 bits). For example, in some embodiments, UESS and R1 may be XORd by a logic circuit to produce S1. S1 is then spread (e.g., by spreading factor 128), modulated (e.g., QPSK modulated), and transmitted (e.g., transmitted in one slot) (step 1216).

Figure 13:
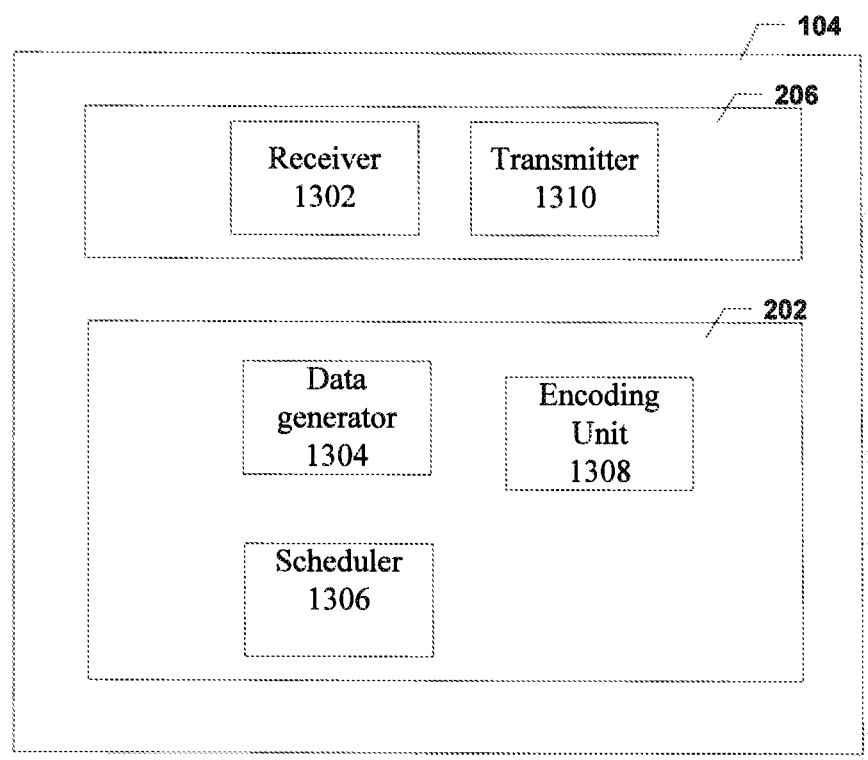
FIG. 13 is a functional block diagram of a base station according to some embodiments.

Referring now to FIG. 13, FIG. 13 is a functional block diagram of base station 104 according to some embodiments. As illustrated in FIG. 13, in some embodiments, base station 104 includes a receiver 1302 for receiving data intended for a UE and/or a data generator 1304 for generating data intended for the UE. Base station 104 may further include a scheduler 1306 for selecting the UE from a set of UEs that base station 104 is serving and for selecting and/or determining control information for use in transmitting the received or generated data to the UE on a shared data channel (e.g., HS-DSCH). The control information selected/determined may include: CCS, RI, MI, and PCI, where each has a corresponding bit sequence. Base station 104 further includes an encoding unit 1308 for, among other things, encoding the control information prior to transmission to the UE. As discussed above with reference to FIG. 8, encoding unit 1308 may include a multiplexor 801 for multiplexing the bit sequences to produce a bit sequence X1, (in some embodiments X1 is sixteen bits). In some embodiments, the first portion of X1 (e.g., the first seven bits of X1) identify a CCS, the next portion of X1 (e.g., the next five bits) identify an RI/MI pair, and the last portion of X1 (e.g., the next four bits of X1) identify a PCI. Encoding unit 1308 may include may also include a padder 802 that pads X1 with bit sequence P (in some embodiments P is eight bits in length) to produce bit sequence X'1. Encoding unit 1308 also includes a convolutional encoder 804 that convolution encodes X'1 to produce encoded bit sequence Z1. Depending on the length of X'1 and on the rate of the convolutional encoder 804, Z1 may be, for example, 48 or 72 bits. For example, when X'1 is 24 bits and the rate is 1/2, then Z1=48 bits and when X'1 is 24 bits and the rate is 1/3, then Z1=72 bits. Encoding unit 1308 also includes a rate matcher configured to produce bit sequence R1 by puncturing bits Z1 (in some embodiments Z1 is punctured such that R1 is 40 bits in length). In some embodiments, encoding unit 1308 also includes a logic circuit 810 configured to bit-mask R1 with a UE specific sequence (UESS) (which may be generated by an encoder 808 that encodes a 16-bit UE ID using a (40, 16) punctured convolutional code) to produce a bit sequence S1 (in some embodiments S1=40 bits). For example, in some embodiments, UESS and R1 may be XORd by logic circuit to produce S1. Base station 104 also includes a transmitter 1310 that then spreads, modulates and transmits S1 in one slot. Some or all of the above functional block, such as scheduler 1306 and encoding unit 1308 may be implemented in processor 202. Receiver 1302 and transmitter 1310 may be implemented in communication circuitry 206.

While various embodiments of the present invention have been described above, it should be understood that they have been presented by way of example only, and not limitation. Thus, the breadth and scope of the present invention should not be limited by any of the above-described exemplary embodiments. Moreover, any combination of the above-described elements in all possible variations thereof is encompassed by the invention unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method for transmitting to a user equipment (UE) control information comprising: channelization-code-set information consisting of seven bits $x_{ccs,1}, x_{ccs,2}, \ldots, x_{ccs,7}$; modulation-scheme and number of transport blocks information consisting of five bits $(x_{ms,1}, x_{ms,2}, x_{ms,3}, x_{ms,4}, x_{ms,5})$; and precoding weight information consisting of four bits $(x_{pwipb,1}, x_{pwipb,2}, x_{pwipb,3}, x_{pwipb,4})$, the method comprising:

multiplexing the channelization-code-set information, the modulation-scheme and number of transport blocks information and the precoding weight information to give a sequence of sixteen bits $(x_{1,1}, x_{1,2}, \ldots, x_{1,16},)$ where $x_{1,i}=x_{ccs,i}$ for i=1, 2, \ldots, 7; $x_{1,i}=x_{ms,i-7}$ for i=8, 9, 10, 11, 12; and $x_{1,i}=x_{pwipb,i-12}$ for i=13, 14, 15, 16;

applying rate 1/2 convolutional coding to the sequence of bits $x_{1,1}, x_{1,2}, \ldots, x_{1,16}$ to obtain a forty-eight bit sequence, $(z_{1,1}, z_{1,2}, \ldots, z_{1,48})$; and puncturing the bits $z_{1,1}, z_{1,2}, z_{1,4}, z_{1,8}, z_{1,42}, z_{1,45}, z_{1,47}, z_{1,48}$ from sequence $z_{1,1}, z_{1,2}, \ldots, z_{1,48}$ to obtain an output sequence consisting of forty bits $(r_{1,1}, r_{1,2} \ldots r_{1,40})$.

2. The method of claim 1, wherein the step of applying rate 1/2 convolutional coding to the sequence of bits $x_{1,1}, x_{1,2}, \ldots, x_{1,16}$ to obtain sequence $z_{1,1}, z_{1,2}, \ldots, z_{1,48}$ comprises:

padding X1 with bit sequence P to produce bit sequence X'1, where X1=$x_{1,1}, x_{1,2}, \ldots, x_{1,16}$; and convolution encoding X'1 to produce the forty-eight bit sequence.

3. The method of claim 1, wherein the method further comprises bit masking the output sequence (R1) with a UE specific sequence (UESS) to produce a bit sequence S1.

4. The method of claim 3, wherein the bit masking step consists of using a logic circuit to XOR UESS and R1 to produce S1.

5. The method of claim 3, wherein the UESS is generated by an encoder that encodes a 16-bit communication device identifier using a punctured convolutional code.

6. The method of claim 3, wherein S1 is spread by spreading factor 128, QPSK modulated, and transmitted in one slot.

7. A base station configured to perform the method of claim 1.

8. A base station operable to transmit to a user equipment, UE, control information comprising: channelization-code-set information consisting of seven bits ($x_{ccs,1}, x_{ccs,2}, \ldots, x_{ccs,7}$); modulation-scheme and number of transport blocks information consisting of five bits ($x_{ms,1}, x_{ms,2}, x_{ms,3}, x_{ms,4}, x_{ms,5}$); and precoding weight information consisting of four bits ($x_{pwipb,1}, x_{pwipb,2}, x_{pwipb,3}, x_{pwipb,4}$), characterized in that the base station comprises an encoding unit for:

multiplexing the channelization-code-set information, the modulation-scheme and number of transport blocks information and the precoding weight information to give a sequence of sixteen bits $x_{1,1}, x_{1,2}, \ldots, x_{1,16}$ (X1), where $x_{1,i}=x_{ccs,i}$ for i=1,2,..., 7; $x_{1,i}=x_{ms,i-7}$ for i=8, 9, 10, 11, 12; and $x_{1,i}=x_{pwipb,i-12}$ for i=13, 14, 15, 16;

applying rate 1/2 convolutional coding to the sequence of bits $x_{1,1}, x_{1,2}, \ldots, x_{1,16}$ to obtain a forty-eight bit sequence ($z_{1,1}, z_{1,2}, \ldots, z_{1,48}$); and puncturing the bits $z_{1,1}, z_{1,2}, z_{1,4}, z_{1,8}, z_{1,42}, z_{45}, z_{1,47}, z_{1,48}$ from sequence $z_{1,1}, z_{1,2}, \ldots, z_{1,48}$ to obtain an output sequence consisting of forty bits ($r_{1,1}, r_{1,2} \ldots r_{1,40}$).

9. The base station of claim 8, wherein the encoding unit comprises a padder that pads X1 with bit sequence P to produce a bit sequence X'1 and a convolutional encoder that convolution encodes X'1 to produce the forty-eight bit sequence.

10. The base station of claim 8, wherein the encoding unit includes a logic circuit configured to bit-mask the output sequence with a UE specific sequence (UESS) to produce a bit sequence S1.

11. The base station of claim 10, wherein the UESS is generated by an encoder that encodes a 16-bit UE ID using a punctured convolutional code.

12. The base station of claim 10, wherein the logic circuit is configured to XOR the UESS and the output sequence to produce S1.

13. The base station of claim 10, further comprising communication circuitry for spreading, modulating and transmitting S1 in one slot.

* * * * *